United States Patent [19]
Fujiwara et al.

[11] Patent Number: 6,052,417
[45] Date of Patent: Apr. 18, 2000

[54] MOTION IMAGE CODING APPARATUS ADAPTIVELY CONTROLLING REFERENCE FRAME INTERVAL

[75] Inventors: Yoichi Fujiwara, Ichihara; Tadao Matsuura; Hiroshi Kusao, both of Chiba, all of Japan

[73] Assignee: Sharp Kabushiki Kaisha, Osaka, Japan

[21] Appl. No.: 09/063,895

[22] Filed: Apr. 22, 1998

[30] Foreign Application Priority Data

Apr. 25, 1997 [JP] Japan ................................ 9-108682

[51] Int. Cl.⁷ ............................................. H04N 7/32
[52] U.S. Cl. .................... 375/240; 348/409; 348/415
[58] Field of Search ................................. 348/384, 390, 348/400, 401, 402, 409, 415, 416; 382/232, 236, 238; 375/240

[56] References Cited

U.S. PATENT DOCUMENTS 5,694,171 12/1997 Katto ........................................ 348/405
5,963,258 10/1999 Nishikawa ............................... 348/415

FOREIGN PATENT DOCUMENTS

0804034 A2 10/1997 European Pat. Off. .
8-65678 3/1996 Japan .
WO/9520863 A1 8/1995 WIPO .

Primary Examiner—Bryan Tung

[57] ABSTRACT

A motion image coding apparatus providing enhanced image quality as compared with the prior art includes a coding unit for coding first, second and third frames, a prediction efficiency calculating circuit for calculating prediction efficiency in inter-frame prediction, in coding by the coding unit using said first or second frame as a reference frame, and a reference frame interval determining circuit for determining a reference frame interval which is a time interval between the first and second frames, time interval between the second frames and time interval between the first frames.

24 Claims, 21 Drawing Sheets

MOTION IMAGE CODING APPARATUS ADAPTIVELY CONTROLLING REFERENCE FRAME INTERVAL

BACKGROUND OF THE INVENTION

1. Field of the Invention

The present invention relates to a motion image coding apparatus. More specifically, the present invention relates to a motion image coding apparatus in which reference frame interval is adaptively controlled based on prediction efficiency.

2. Description of the Background Art

Recently, inter-frame predictive coding utilizing motion compensated inter-frame prediction in accordance with MPEG (Moving Picture Experts Group)-1 (ISO: International Organization for Standardization/IEC: International Electrotechnical Commission 11172) or MPEG-2 (ISO/IEC 13818) has come to be used in the fields of storage, communication, broadcasting and so on, as a method of motion image coding. In such a method, frames of moving image sequence is divided into coding blocks, a prediction block is generated using a motion vector detected from a reference frame for each coding block, and motion compensated inter-frame prediction is performed.

Coding mode for coding blocks in MPEG includes forward prediction mode in which prediction based on a reference frame in the past is used, a backward prediction mode in which prediction based on a future reference frame is used, bidirectional prediction mode in which a mean value of predictions based on a reference frame in the past and a reference frame in the future is used, and intra-frame coding mode in which prediction is not used.

Further, in accordance with MPEG, each frame is classified as an intra-frame coding frame which is coded only in the intra-frame coding mode, a forward prediction coding frame which is coded using the forward prediction mode or the intra-frame coding mode, or a bidirectional prediction coding frame which is coded using the forward prediction mode, the backward prediction mode, the bidirectional prediction mode or the intra-frame coding mode, and the classified frame is coded.

Here, the intra-frame coding frame is referred to as an I picture, the forward prediction coding frame is referred to as P picture, and the bidirectional prediction coding frame is referred to as a B picture. FIG. 1 shows prediction structure of I, P and B pictures.

In a sequence of motion images, first, an I picture 21 is coded. I picture can be decoded simply by the coding data of itself. Thereafter, I picture 21 is used as a reference frame and by forward prediction from I picture 21, a P picture 23 is coded. Thereafter, B picture 21 is coded utilizing any of forward prediction, backward prediction and bidirectional prediction, or not utilizing prediction at all, with I picture 21 serving as a reference frame in the past and P picture 23 serving as a reference frame in the future. Following coding of B picture 22, subsequent P picture 25 is coded using P picture 23 as a reference frame, or not using prediction at all. After coding of P picture 25, B picture 24 is coded using P pictures 23 and 25 as reference frames, or not using prediction at all.

From the foregoing, it can be seen that the order of input of images is I picture 21, B picture 22, P picture 23, B picture 24 and P picture 25 while the order of coding is I picture 21, P picture 23, B picture 22, P picture 25 and B picture 24, and hence it is necessary to encode with the order of images rearranged.

Referring to FIG. 2A, when a time interval between reference frames (hereinafter referred to as a reference frame interval) is assumed to be 1, then the order of input of images is I picture, P picture, P picture, P picture, P picture, P picture, and P picture. At this time, the order of coding is the same.

Referring to FIG. 2B, when the reference frame interval is 2, the order of input of images is B picture, I picture, B picture, P picture, B picture, P picture, B picture and P picture. By contrast, the order of coding is I picture, B picture, P picture, B picture, P picture, B picture, P picture, and B picture.

Referring to FIG. 2C, when the reference frame interval is 3, the order of input of images is B picture, B picture, I picture, B picture, B picture, P picture, B picture, B picture, and P picture. By contrast, the order of coding is I picture B picture, B picture, P picture, B picture, B picture, P picture, B picture, and B picture.

Referring to FIG. 3, the coding apparatus for the conventional motion image coding described above includes a frame memory 1, an image rearrangement control circuit 28, a motion vector detecting circuit 3, a coding mode determining circuit 4, a motion compensation predicting circuit 5, a selector 6, a subtractor 7, an encoder 8, a decoder 9, an adder 10 and a frame memory 11.

Frame memory 1 temporarily stores images for rearranging the order or sequence of the images. Image rearrangement control circuit 28 is connected to frame memory 1 and controls frame memory 1. Motion vector detecting circuit 3 is connected to frame memory 1 and detects a motion vector for motion compensated inter-frame prediction. Coding mode determining circuit 4 determines coding mode from the information calculated by motion vector detecting circuit 3. Motion compensation predicting circuit 5 is connected to motion vector detecting circuit 3 and coding mode determining circuit 4, and generates a prediction block. Selector 6 receives an output from coding mode determining circuit 4 as a selection signal, and receives an output of motion compensation predicting circuit 5 and '0' as input signals.

Subtractor 7 is connected to outputs of frame memory 1 and selector 6, and calculates a difference block which is a difference between a coding block and a prediction block. Encoder 8 is connected to an output of subtractor 7 and encodes the difference block. Decoder 9 is connected to an output of encoder 8, and decodes encoded data. Adder 10 is connected to outputs of decoder 9 and selector 6, and generates a decoding block by adding the decoded difference block and prediction block. Frame memory 11 is connected to an output of adder 10, and stores a decoded reference frame consisting of the decoding block.

Operation of the coding apparatus will be described in the following. Input images are once written in frame memory 1 in the order of input, and read in the order of coding described above, by image rearrangement control circuit 28. Pixel data of encoding block read from frame memory 1 are supplied to motion vector detecting circuit 3.

Motion vector detecting circuit 3 reads data of the reference frame from frame memory 11, performs block matching calculation with the coding block, and detects motion vector. At this time, in motion vector detecting circuit 3, prediction error in motion compensated inter-frame prediction and complexity of images (hereinafter referred to as "activity" in the specification) of the coding block are calculated and supplied to coding mode determining circuit 4.

Coding mode determining circuit 4 determines coding mode of the coding block of interest, using information such as the prediction error and the activity output from motion vector detecting circuit 3. As the prediction mode, one suffering from smallest prediction error is selected. As to whether intra-frame coding is used or not, it is determined based on comparison of magnitude in prediction error and activity. When prediction error is small, inter-frame prediction is selected and if the activity is small, intra-frame coding is selected.

Motion compensation predicting circuit 5 generates a prediction block using pixel data of the reference frame read from frame memory 11, in accordance with the prediction mode determined by coding mode determining circuit 4.

Selector 6 switches outputs in accordance with the prediction mode determined by the coding mode determining circuit 4. Here, in intra-frame coding mode, '0' is selected and otherwise, an output (prediction block) of motion compensation predicting circuit 5 is selected. Here, '0' indicates that neither a block to be subtracted nor a block to be added exist in subtractor 7 and adder 10, respectively.

A difference block between coding block and prediction block is calculated by subtractor 7. The difference block is coded by encoder 8, and coded data is output.

I picture and P picture are used for prediction of subsequent frames, as reference frames. Therefore, coded data of the I picture and the P picture are decoded by decoder 9, and the decoded difference block is added to the prediction block in adder 10. An output (decoding block) of adder 10 is stored in frame memory 11.

As described above, coded data of I and P pictures are decoded and used for prediction of subsequent frames. Thereafter, coding error generated in I and P pictures are propagated along time axis through P picture. By contrast, B picture is not used for prediction of other frames. Therefore, coding error generated in the P picture is not propagated.

The inter-frame prediction of the P picture is based only on the past, while inter-frame prediction of the B picture is based both on the past and the future. Therefore, generally, prediction error is smaller in B picture than P picture, and the amount of coding data generated is smaller.

Utilizing the nature described above, smaller amount of information is allocated to B picture from which coding error is not propagated and not much coding data is generated, while larger amount of information is allocated to I and P pictures from which coding error propagates. Consequently, I and P pictures come to have higher image quality, and prediction error of B picture using I and P pictures for prediction is reduced. Since the prediction error of the B picture is reduced and amount of information necessary for coding the B picture is reduced, amount of information to be allocated to I and P pictures is increased. As the amount of information allocated to I and P picture is increased, I and P pictures come to have ever higher image quality. In this manner, the motion image coding enters a virtuous circle, enabling enhancement of image quality of the entire sequence.

However, if I and P pictures are poor in quality, prediction error of B picture increases, requiring larger amount of information for coding the B picture. As larger amount of information is required for coding the B picture, the amount of information to be allocated to I and P pictures is reduced, lowering image quality of I and P pictures. As the image quality of I and P pictures lowers, the prediction error of B picture increases. In this manner, motion image coding enters a vicious circle, considerably degrading image quality of the entire sequence.

Here, the amount of prediction error in motion compensated inter-frame prediction depends on distance in time between the coding frame and reference frame, area of search of the motion vector, amount of movement of an object and so on.

The method of detecting motion vector for motion compensated inter-frame prediction will be described with reference to FIG. 4. Block matching method is generally known as a method of detecting motion vector. In block matching method, for a prediction block candidate in an area of motion vector search, an amount of error between the prediction block candidate and the coding block is calculated. A candidate of which error amount is the smallest is considered the prediction block, and relative amount of offset of the prediction block position from coding block position is assumed to be the motion vector.

The farther the coding frame and the reference frame are away from each other along the time axis, the larger becomes the amount of movement of the object, and therefore larger area of motion vector search is necessary.

Referring to FIG. 5, assume that the area of search of the motion vector necessary when the coding frame and reference frame are away from each other by one frame time is ±K in the horizontal direction and ±L in the vertical direction. Here, if the coding frame and the reference frame are away from each other by 2 frame time, necessary area of search of the motion vector is ±2K in the horizontal direction and ±2L in the vertical direction.

If the coding frame and reference are further away in time, movement of the object would involve complex components such as rotation and deformation, not only translation, which makes prediction difficult.

Therefore, generally, when the coding frame and reference frame are farther away in time, prediction error is increased. More specifically, the larger the reference frame interval, the larger the prediction error in coding the P picture. On the other hand, when the reference frame interval is larger and the number of frames of the B picture existing between the I and P pictures increases, the ratio of B picture to which small amount of information is allocated increases. Accordingly, the number of bits to be allocated to the I and P pictures is increased, contributing to enhanced image quality of I and P pictures.

From the foregoing, it can be seen that there is an optimal value of reference frame interval for each image sequence.

Japanese Patent Laying-Open No. 8-65678 entitled "Moving Image Encoding System" discloses a method of optimizing reference frame interval m and the number n of P pictures GOP by GOP (Group of Pictures) each consisting of N frames. Here, in the GOP, there is one I picture, and values N, m and n satisfy the following equation (1).

$$N=m(n+1) \qquad (1)$$

Referring to FIG. 6, an apparatus performing the process disclosed in Japanese Patent Laying-Open No. 8-65678 includes a frame memory 1, an image rearrangement control circuit 2, a motion vector detecting circuit 3, a coding mode determining circuit 4, a motion compensation predicting circuit 5, a selector 6, a subtractor 7, an encoder 8, a decoder 9, an adder 10, a frame memory 11, a correlation calculating circuit 26 and a prediction structure determining circuit 27. Portions corresponding to those of the conventional coding apparatus described with reference to FIG. 3 are denoted by the same reference characters. Names and functions are the same and therefore description thereof is not repeated.

Correlation calculating circuit 26 is connected to outputs of frame memory 1 and motion compensation predicting circuit 5, and calculates correlation coefficient between the coding block and the prediction block. Prediction structure determining circuit 27 determines the aforementioned reference frame interval m and the number n of P pictures, based on the correlation coefficient calculated by correlation calculating circuit 26.

Correlation calculating circuit 26 calculates the correlation coefficient ρ represented by the following equation (2).

$$\rho = \frac{E[x(s)x(s-1)]}{E[x(s)^2]} \quad (2)$$

where x(s) represents pixel value of coding image in sth frame, and x(s−1) represents pixel value of coding image of the s−1th frame. E[·] represents an operation for calculating a mean value.

Prediction structure determining circuit 27 calculates coding efficiency Gain represented by the equation (3) for every possible combination of (m, n) in the number N of frames of GOP, and finds that set of (m, n) which provides the maximum Gain.

$$Gain^{-1} = [2w_P(1-\rho^m)]^{n/N} \left[ w_B \frac{S(m-1)}{m-1} \right]^{(m-1)(n+1)/N} \quad (3)$$

where $w_P$ and $W_B$ are constants and S(m−1) is given by the following equation (4).

$$S(m-1) = \frac{m-1}{2}(3+\rho^m) - 2\rho \cdot \frac{1-\rho^{m-1}}{1-\rho} \quad (4)$$

Image rearrangement control circuit 2 determines positions of I, P and B pictures in accordance with the combination (m, n) determined by prediction structure determining circuit 27, and reads coding frame from frame memory 1.

In the apparatus disclosed in Japanese Patent Laying-Open No. 8-65678, however, complicated calculations as represented by the equations (2), (3) and (4) are indispensable. These include a plurality of multiplications, divisions and power calculation. Therefore, for implementation, large scale operating circuit and long time of calculation are necessary. Further, equation (2) represents calculation pixel by pixel, which involves formidable amount of processing and, as it includes two multiplications, significantly large circuit scale is necessary.

Calculation of (m, n) is performed GOP by GOP, and therefore when the correlation coefficient given by the equation (2) changes abruptly because of abrupt movement of the object or camera at the time of real time coding, change in prediction structure may not follow the change in image, possibly resulting in degraded image quality.

SUMMARY OF THE INVENTION

The present invention was made to solve the above described problems and its object is to provide a motion image coding apparatus providing enhanced image quality as compared with the prior art.

Another object of the present invention is to provide a motion image coding apparatus having smaller circuit scale and providing enhanced image quality as compared with the prior art.

A still further object of the present invention is to provide a motion image coding apparatus capable of correct prediction efficiency calculation and providing enhanced image quality as compared with the prior art.

A still further object of the present invention is to provide a motion image coding apparatus capable of controlling reference frame interval with the interval being smaller than the number of frames of GOPs and providing enhanced image quality as compared with the prior art.

According to an aspect of the present invention, in the motion image coding apparatus, a plurality of frames constituting a motion image sequence is divided into a plurality of coding blocks, and each of the plurality of frames is coded in accordance with coding mode, coding block by coding block.

The coding mode includes forward prediction mode using prediction based on a reference frame in the past, a backward prediction mode using prediction based on a reference frame in the future, a bidirectional prediction mode using prediction based on a mean value of predictions based on the reference frame in the past and based on the reference frame in the future, and an intra-frame coding mode not using inter-frame prediction.

Each frame is classified as a first frame in which each of the plurality of coding blocks is coded in accordance with the intra-frame coding mode; a second frame in which each of the plurality of coding blocks is coded in accordance with the forward prediction mode or the intra-frame coding mode; or a third frame in which each of the plurality of coding blocks is coded in accordance with any of the forward prediction mode, the backward prediction mode, the bidirectional prediction mode and the intra-frame coding mode.

The motion image coding apparatus includes: a coding unit for coding the first, second and third frames; a prediction efficiency calculating circuit for calculating inter-frame prediction efficiency in coding at the coding unit using the first or the second frame as a reference frame; and a reference frame interval determining circuit for determining, in accordance with an output from the prediction efficiency calculating circuit, a reference frame interval which is time interval between the first and second frames, time interval between the second frames, and time interval between the first frames.

The reference frame interval is determined in accordance with the prediction efficiency. When prediction efficiency is low as in the case where when the object or camera moves considerably, for example, the reference frame interval is made smaller to improve prediction efficiency and hence to enhance image quality. When prediction efficiency is high, the reference frame interval is enlarged and amount of information allocated to the reference frame is increased, so as to enable enhancement in image quality.

Preferably, the prediction efficiency calculating circuit includes a first circuit for calculating the prediction efficiency using prediction error (hereinafter referred to as block prediction error) in inter-frame prediction for each of the plurality of coding blocks, and using an activity of each of the plurality of coding blocks.

When the block prediction error is large, the reference frame interval is made smaller to improve prediction efficiency and to enhance image quality. When the block prediction error is small, the reference frame interval is made larger and amount of information allocated to the reference frame is increased, so as to enhance image quality.

More preferably, the first circuit includes a multiplier for multiplying the activity by a prescribed coefficient, a comparator receiving an output from the multiplier, the block prediction error and a prescribed threshold value for comparing the block prediction error with the output of the multiplier, and for comparing the block prediction error and prescribed threshold value, and a counter connected to an output of the comparator for counting for each frame the block prediction error smaller than the output of the multiplier and the block prediction error smaller than the prescribed threshold value, and outputting result of counting as the prediction efficiency.

Since prediction efficiency is calculated simply by the comparator and a counter, circuit scale of the circuit for calculating prediction efficiency is made very compact. Further, not only prediction error but also activity is used for calculating prediction efficiency, so that influence of complexity of pictures of the coding block on the prediction efficiency is suppressed, enabling calculation of correct prediction efficiency. Accordingly, a motion image coding apparatus with small circuit scale is provided.

More preferably, the first circuit includes a divider receiving the block prediction error and the activity and dividing the activity by the block prediction error, and a circuit for accumulating outputs of the divider and calculating the prediction efficiency.

Since threshold determination of each coding block is eliminated, influence of erroneous threshold determination is avoided, and hence correct calculation of prediction efficiency is ensured. Further, not only the prediction error but also the activity are used for calculating the prediction efficiency, so that influence of complexity of pictures in the coding block on the prediction efficiency is suppressed, whereby correct prediction efficiency can be calculated.

More preferably, the reference frame interval determining circuit further includes a circuit for controlling the reference frame interval, which controls, only when there is the third frame in which the number of coding blocks for which the forward prediction mode is selected is below a second threshold value and the number of coding blocks for which the backward prediction mode is selected is below a third threshold value, the reference frame interval after the third frame.

Although prediction efficiency lowers temporarily because of a scene change or a flash light emission, the reference frame interval is not set smaller. This enables enhancement of image quality of the motion image sequence as a whole.

More preferably, the reference frame interval determining circuit includes a circuit for reducing, when the prediction efficiency in coding the first or second frame is below a first threshold value, the reference frame interval in coding the following frames, and a circuit for increasing, when the prediction efficiency in coding the first or second frame exceeds a second threshold value, the reference frame interval in coding the following frames.

The reference frame interval may be increased/decreased in coding both the first and second frames. Therefore, the reference frame interval can be controlled with the interval being smaller than the number of frames of GOP.

More preferably, the reference frame interval determining circuit includes a circuit for determining the reference frame interval, when the position of the coding frame of the first or second frame is determined, such that among candidate frames for the coding frame, one of which prediction efficiency exceeds a prescribed threshold value and which is newest in time axis is selected as the coding frame.

Prediction efficiency for a selectable reference frame interval is estimated one by one, before coding the first and second frames. Based on the estimated prediction efficiency, the reference frame interval to be used next is determined. Therefore, optimal reference frame interval in coding the first and second frames is selected.

According to another aspect, the present invention provides a motion image coding apparatus in which each of a plurality of field images constituting a motion image sequence is divided into a plurality of coding blocks, and each of the plurality of field images is coded in accordance with a coding mode, coding block by coding block.

The coding mode includes a forward prediction mode using prediction based on a reference field image in the past, a backward prediction mode using prediction based on a reference field image in the future, a bidirectional prediction mode using a mean value of prediction based on the reference field image in the past and prediction based on the reference field image in the future, and an intra-field coding mode not using inter-field prediction.

Each field image is classified as a first field image in which each of the plurality of coding blocks is coded in accordance with the intra-field coding mode, a second field image in which each of the plurality of coding blocks is coded in accordance with the forward prediction mode or the intra-field coding mode, or a third field image in which each of the plurality of coding blocks is coded in accordance with the forward prediction mode, the backward prediction mode, the bidirectional prediction mode or the intra-field coding mode.

The motion image coding apparatus includes a coding unit for coding the first, second and third field images, a prediction efficiency calculating circuit for calculating prediction efficiency in inter-field prediction, in coding at the coding unit where the first field image or the second field image is used as a reference field, and a reference field image interval determining circuit for determining a reference field image interval which is time interval between the first and second field images, time interval between the second field images and time interval between the first field images.

Enhanced image quality is obtained in the similar manner in field structure coding, as in frame structure coding.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 7:
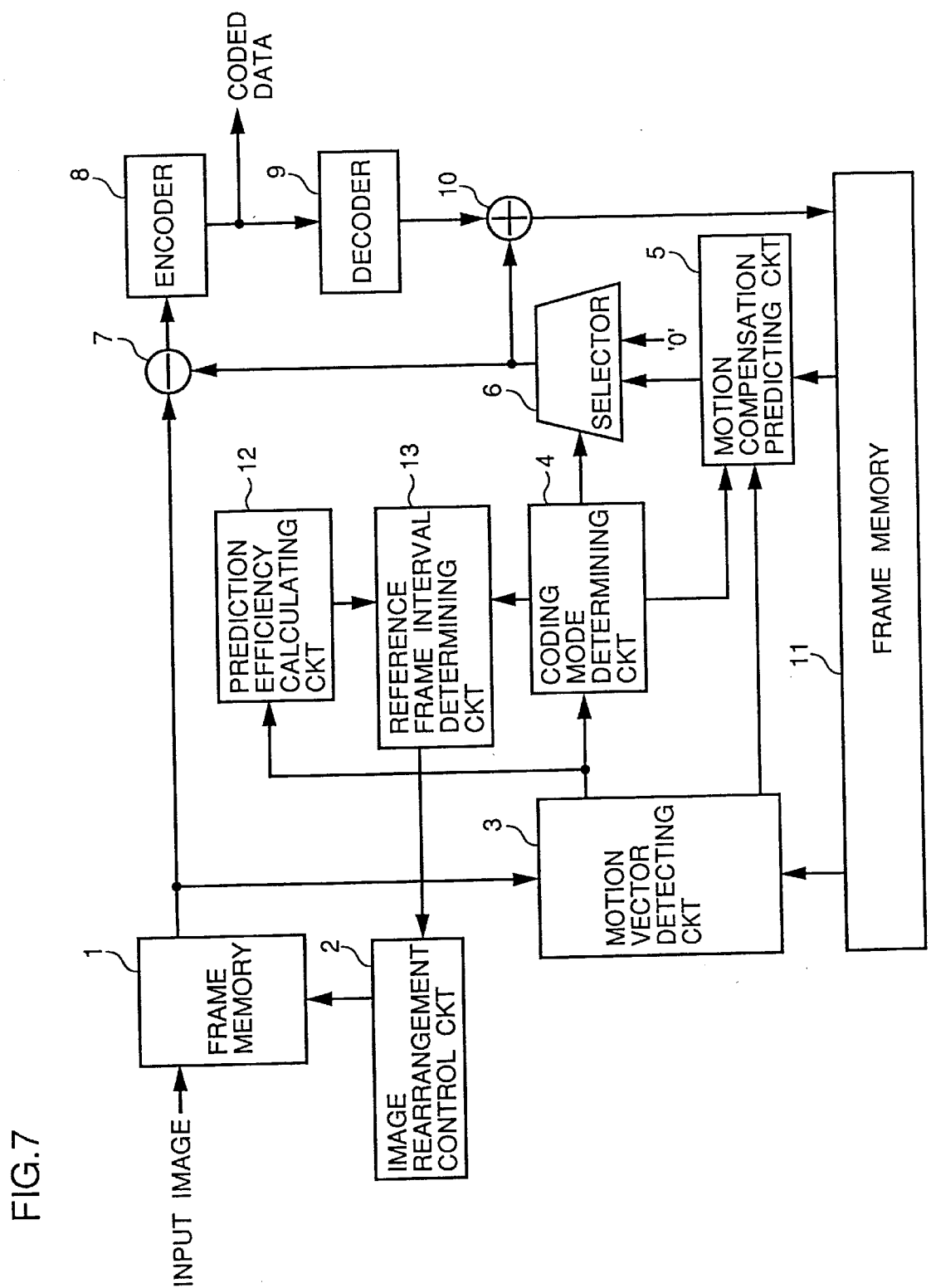
FIG. 7 is a block diagram showing a structure of a motion image coding apparatus in accordance with one embodiment of the present invention.

Referring to FIG. 7, the motion image coding apparatus in accordance with the present invention includes a frame memory 1, an image rearrangement control circuit 2, a motion vector detecting circuit 3, a coding mode determining circuit 4, a motion compensation predicting circuit 5, a selector 6, a subtractor 7, an encoder 8, a decoder 9, an adder 10, a frame memory 11, a prediction efficiency calculating circuit 12 and a reference frame interval determining circuit 13. Portions corresponding to those of the conventional coding apparatus described with reference to FIGS. 3 to 6 are denoted by the same reference characters. Since names and functions are the same, description thereof is not repeated.

Prediction efficiency calculating circuit 12 calculates the prediction efficiency of the coding frame of interest, based on the activity of the coding block and the prediction error in motion compensated inter-frame prediction, output from motion vector detecting circuit 3 and used in coding mode determining circuit 4.

Reference frame interval determining circuit 13 determines the reference frame interval m and controls image rearrangement control circuit 2, based on the prediction efficiency calculated by the prediction efficiency calculating circuit 12 and the coding mode determined by the coding mode determining circuit 4.

Image rearrangement control circuit 2 reads coding frames from frame memory 1 in an order designated by the reference frame interval determining circuit 13.

Figure 8:
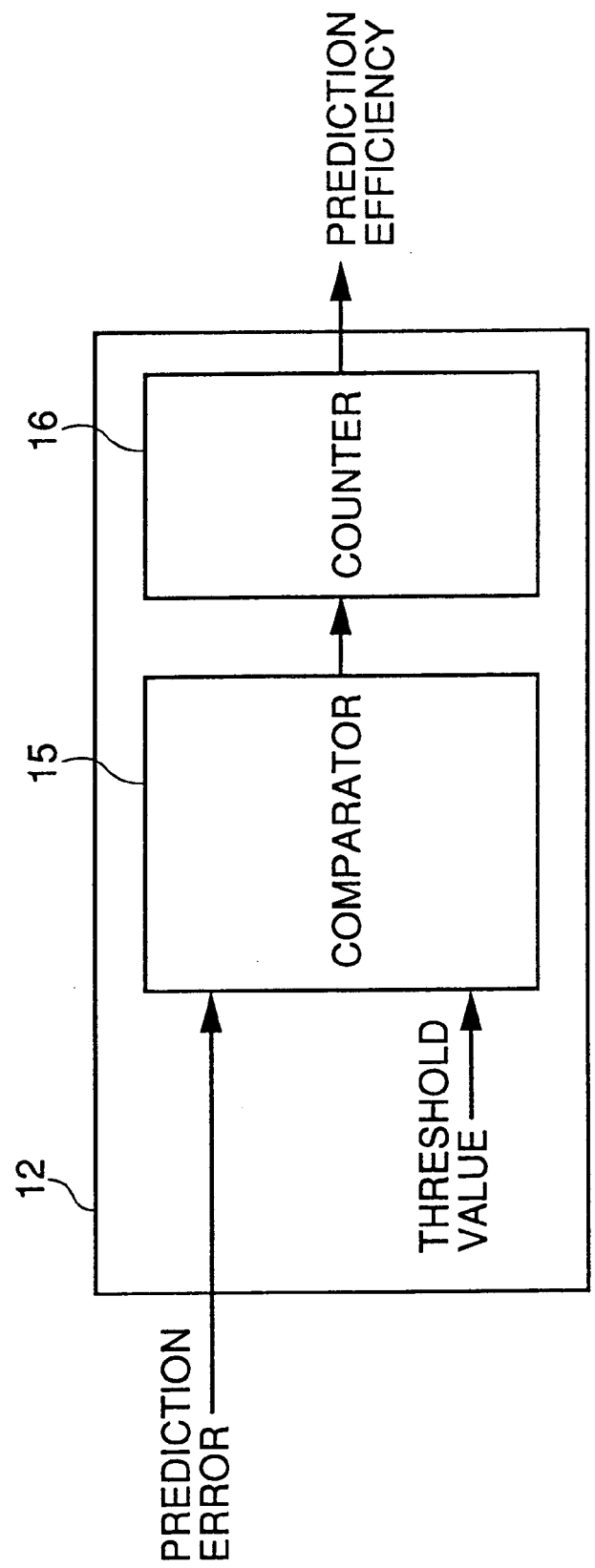
FIG. 8 is a first block diagram showing a structure of a prediction efficiency calculating circuit.

Referring to FIG. 8, prediction efficiency calculating circuit 12 includes a comparator 15 comparing the prediction error with a prescribed threshold value for determining whether it is a prediction block with high efficiency or not, and a counter for counting the number of prediction blocks with high efficiency.

In the present embodiment, a block for which prediction error is below the prescribed threshold value is determined to be a block with high prediction efficiency (hereinafter referred to as a prediction block with high efficiency), and the number of prediction blocks with high efficiency in the frame is regarded as prediction efficiency of the frame. Determination of the prediction block with high efficiency may be performed for every block in the frame, or only some of the blocks in the frame.

Here, counter 16 is reset to zero for each frame, counts the number of prediction blocks with high efficiency, and the count value is used as the prediction efficiency of the coding frame.

Figure 9:
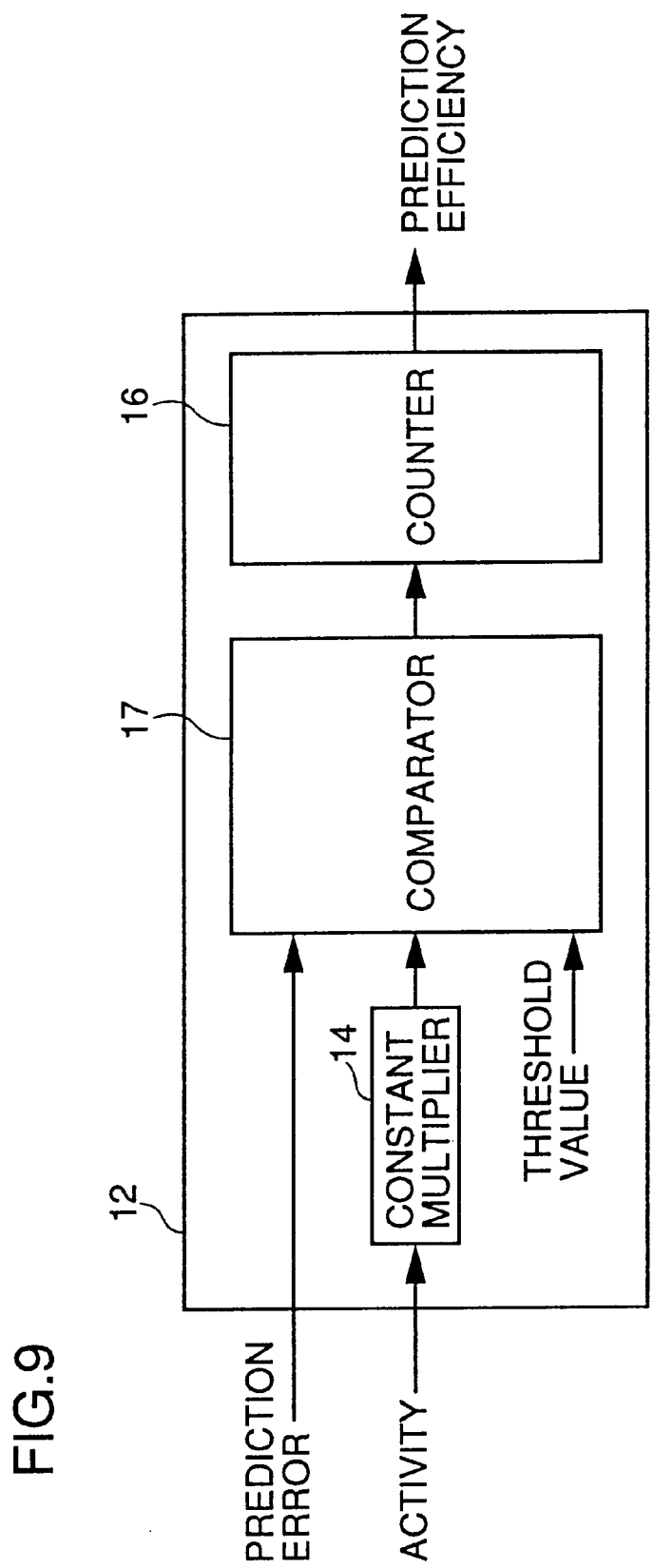
FIG. 9 is a second block diagram showing a structure of a prediction efficiency calculating circuit.

Referring to FIG. 9, prediction efficiency calculating circuit 12 may have the following structure. Prediction efficiency calculating circuit 12 includes a constant multiplier 14 for multiplying the activity by a constant $\alpha$, a comparator 17 comparing the prediction error, an output from constant multiplier 14 and a threshold value for determining whether it is a prediction block with high efficiency, and a counter 16 for counting the number of prediction blocks with high efficiency.

Figure 10:
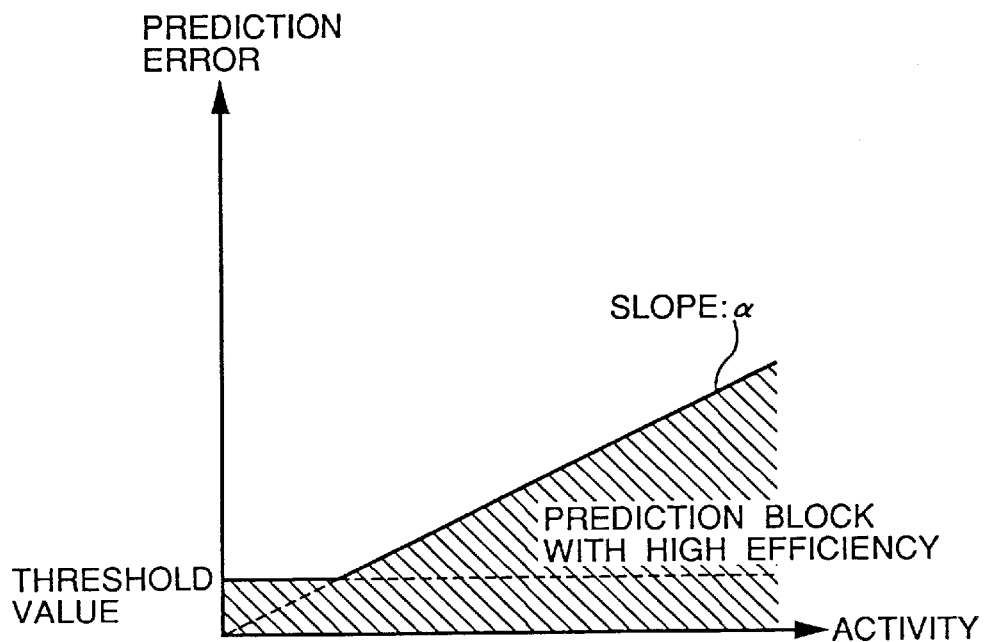
FIG. 10 shows characteristics of a comparator which is a component of the prediction efficiency calculating circuit shown in FIG. 9.

FIG. 10 shows an exemplary characteristic of comparator 17. In FIG. 10, an slope $\alpha=0$ corresponds to the characteristic of comparator 15.

Generally, it holds that the smaller the prediction efficiency, the larger the prediction error. In addition, the prediction error tends to be larger when the picture is complicated, that is, when the activity is large. This means that even when motion of the coding block is correctly followed by motion vector detection, the prediction error would be larger if the activity is large. Namely, prediction efficiency cannot correctly be determined based only on the magnitude of prediction error. In the following expression (5), the prediction error is divided by the activity, so as to reduce influence of the activity on the prediction efficiency.

$$\frac{\text{Prediction Error}}{\text{Activity}} \qquad (5)$$

More specifically, the value of expression (5) is small for the coding block having high prediction efficiency, while the value of expression (5) is large for a coding block having low prediction efficiency. In other words, when the picture is complicated while prediction is correct, the value of expression (5) is smaller, and when the picture is simple and prediction is not correct, the value of expression (5) is large.

Referring to FIG. 10, a coding block for which the value of expression (5) is below a constant α is determined to be the prediction block with high efficiency. However, when prediction error is sufficiently small, the coding efficiency does not decrease even when the value of expression (5) exceeds the constant α. Therefore, a prescribed threshold value is set, and when the prediction error is smaller than the prescribed threshold value, the coding block is determined to be the prediction block with high efficiency. Therefore, a point determined by the prediction error and the activity of the coding block is plotted on the graph of FIG. 10, and when the point is in the hatched region, the block will be determined as the prediction block with high efficiency. Determination of the prediction block with high efficiency may be performed on every block in the frame, or only on some of the blocks in the frame.

In the prediction efficiency calculating circuit 12 of FIG. 9, the prediction error and the value obtained by multiplying the activity by the constant α are compared with each other, thus performing a process equivalent to the above described determination. Counter 16 is reset to 0 for every frame, counts the number of prediction blocks with high efficiency, and the count value is used as the prediction efficiency of the frame.

Prediction efficiency calculating circuit 12 shown in FIG. 9 allows calculation of correct prediction efficiency by using not only the prediction error but also the activity in calculating the prediction efficiency.

Figure 11:
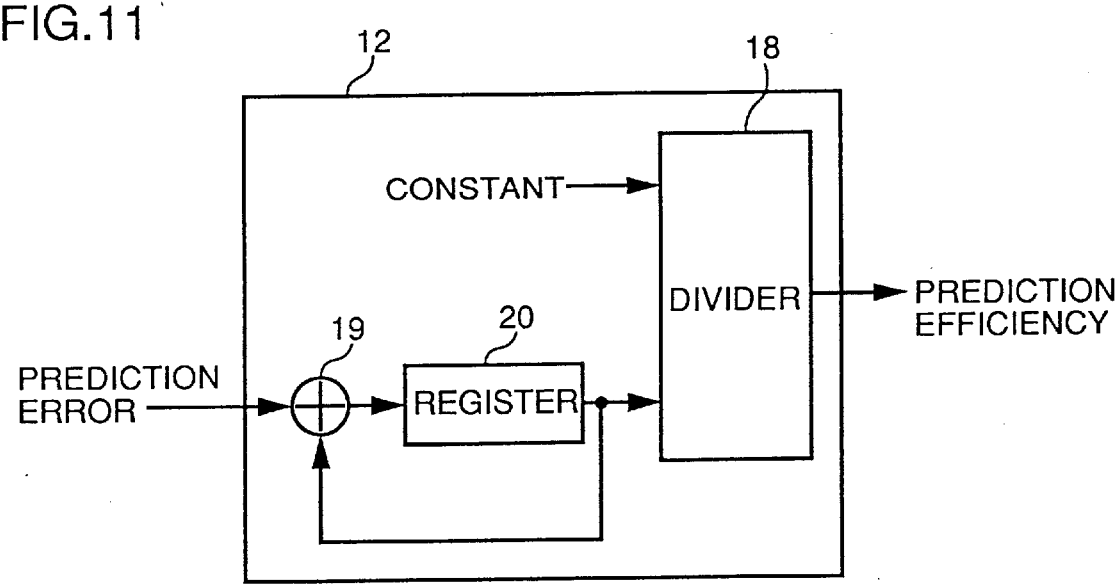
FIG. 11 is a third block diagram showing a structure of the prediction efficiency calculating circuit.

Referring to FIG. 11, prediction efficiency calculating circuit 12 may have the following structure. Prediction efficiency calculating circuit 12 includes an adder 19 and a register 20 for holding result of addition. Adder 19 and register 20 constitute an accumulator which calculates an accumulated value of the prediction error. Prediction efficiency calculating circuit 12 further includes a divider 18 for calculating a reciprocal of the accumulated value of the prediction error.

Register 20 is reset for every frame, and accumulates for one frame, the prediction error of each coding block.

Prediction efficiency for the coding frame calculated by divider 18 is given by the following expression (6).

$$\frac{\text{Constant}}{\text{Accumulated Prediction Error} + 1} \quad (6)$$

Here, "+1" in the denominator of expression (6) is added in order to prevent the denominator of expression (6) from assuming zero when the accumulated prediction error is 0, and the value to be added is not limited to 1.

In expression (6), it is determined that the smaller the prediction error, the higher the prediction efficiency, and the reciprocal of the accumulated prediction error is used as the prediction efficiency of the coding frame. The calculation of accumulated prediction error may be performed on every block in the frame or only on some blocks in the frame.

Figure 12:
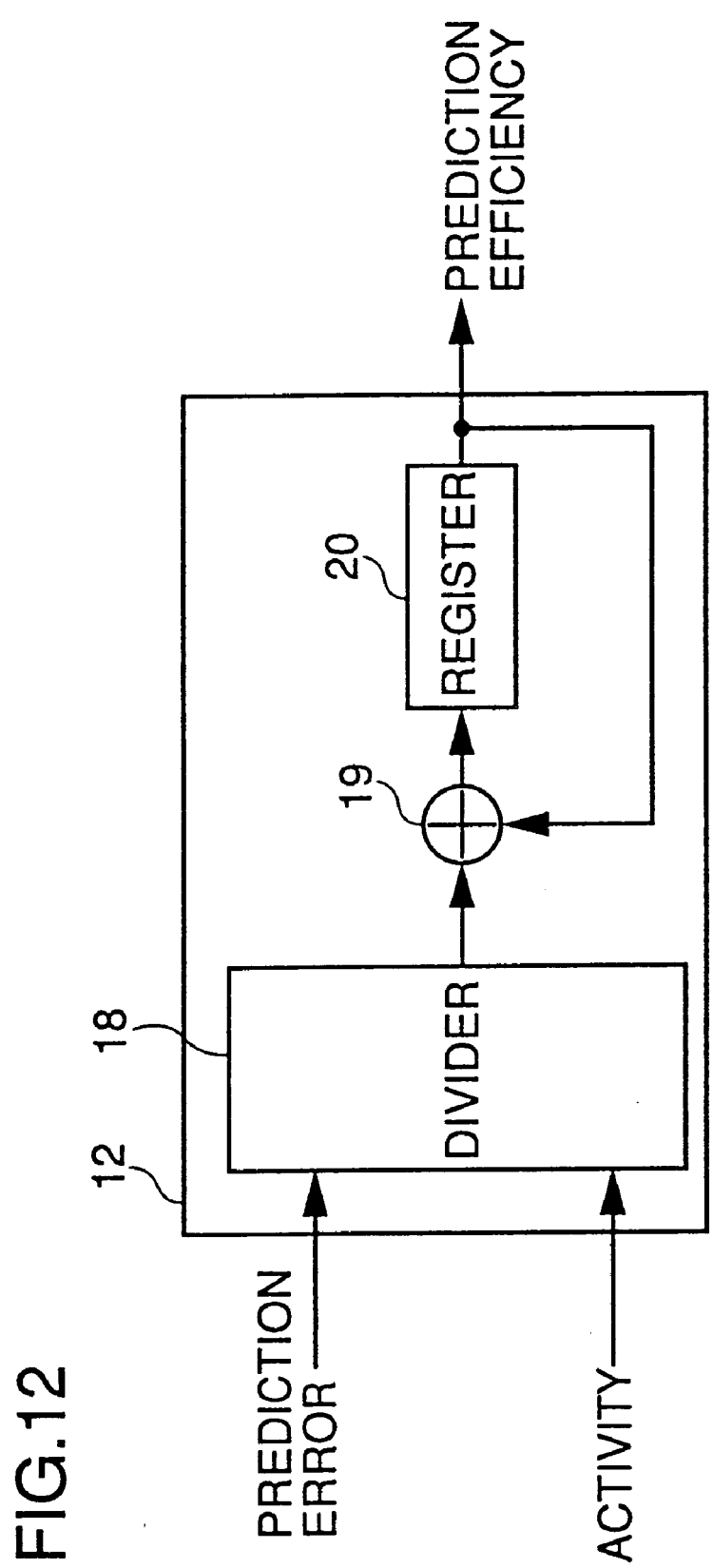
FIG. 12 is a fourth block diagram showing a structure of the prediction efficiency calculating circuit.

Referring to FIG. 12, prediction efficiency calculating circuit may have the following structure. Prediction efficiency calculating circuit 12 includes a divider 18, an adder 19 and a register 20. Adder 19 and register 20 constitutes an accumulator as in prediction efficiency calculating circuit 12 described with reference to FIG. 11, and which accumulator accumulates outputs from divider 18 for one frame. Divider 18 calculates for every coding block, the prediction efficiency given by the following expression (7).

$$\frac{\text{Activity}}{\text{Prediction Error} + 1} \quad (7)$$

Here, "+1", in the denominator of expression (7) is added to prevent the denominator of expression (7) from assuming 0 when the prediction error is 0, and the value to be added is not limited to 1.

The expression (7) is the reciprocal of the expression (5). The value of expression (7) is large in a coding block having high prediction efficiency, and is small in a coding block having low prediction efficiency.

Therefore, adder 19 is capable of calculating the prediction efficiency of the coding frame by accumulating over 1 frame, the values of expression (7) calculated coding block by coding block. The accumulation of the prediction error may be performed on every block in the frame, or only on some blocks of the frame.

The prediction efficiency calculating circuits 12 described with reference to FIGS. 11 and 12 are different from prediction efficiency calculating circuits 12 described with reference to FIGS. 8 and 9 in that threshold determination for each coding block is not necessary. Therefore, influence of erroneous threshold determination is avoided, enabling calculation of correct prediction efficiency.

Prediction efficiency calculating circuits 12 described with reference to FIGS. 8, 9, 11 and 12 respectively utilize the prediction error and/or the activity in calculating the prediction efficiency. These parameters are generally used for determining the coding mode, and therefore it is not necessary to newly calculate these parameters. Therefore, the hardware scale is hardly increased in calculating the prediction efficiency.

For the prediction error in the coding block, equation (8) or (9) is used.

$$(\text{Prediction Error}) = \sum_{i=0}^{B-1} |xi - pi| \quad (8)$$

$$(\text{Prediction Error}) = \sum_{i=0}^{B-1} (xi - pi)^2 \quad (9)$$

Here x represents pixel value of the coding block, p represents pixel value of the prediction block, B represents number of pixels in the block and i represents an index for the pixel.

For the activity in the coding block, the equation (10) or (11) is used.

$$(\text{Activity}) = \sum_{i=0}^{B-1} |xi - d| \quad (10)$$

$$(\text{Activity}) = \sum_{i=0}^{B-1} (xi - d)^2 \quad (11)$$

where $$d = \frac{1}{B}\sum_{i=0}^{B-1} xi \qquad (12)$$

In expression (12), d represents mean value (DC component) of the pixel value in the coding block. Therefore, the activity of equation (10) corresponds to the sum of absolute values of AC components in the coding block, while the activity of equation (11) corresponds to the square sum of AC components in the coding block.

Referring to FIGS. 13 to 21, operations of prediction efficiency calculating circuit 12 and reference frame interval determining circuit 13 will be described. Operations when coding I, P and B pictures will be described separately.

Figure 13:
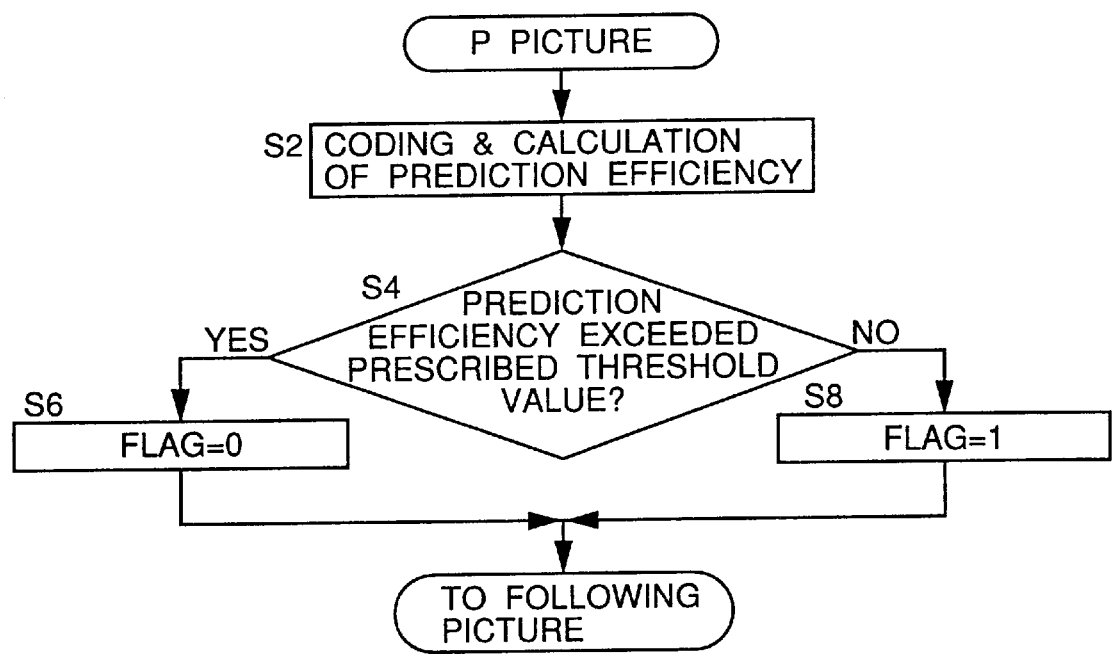
FIG. 13 is a flow chart showing an operation of the motion image coding apparatus when a P picture is coded.

Referring to FIG. 13, when the P picture is coded, prediction efficiency calculating circuit and reference frame interval determining circuit 13 operate in the following manner. Coding of the P picture is performed and prediction efficiency calculating circuit 12 calculates the prediction efficiency (S2). Reference frame interval determining circuit 13 determines whether the prediction efficiency exceeds a prescribed threshold value or not (S4). When the prediction efficiency exceeds the prescribed threshold value (YES in S4), reference frame interval determining circuit 13 sets a flag to zero (S6). When the prediction efficiency is below the prescribed threshold value (NO in S4), reference frame interval determining circuit 13 sets the flag to 1 (S8). The flag is for determining whether the reference frame interval m is to be reduced after coding the B picture. When the flag is set to 1, reference frame interval determining circuit 13 reduces the reference frame interval m after coding the B picture.

Figure 14:
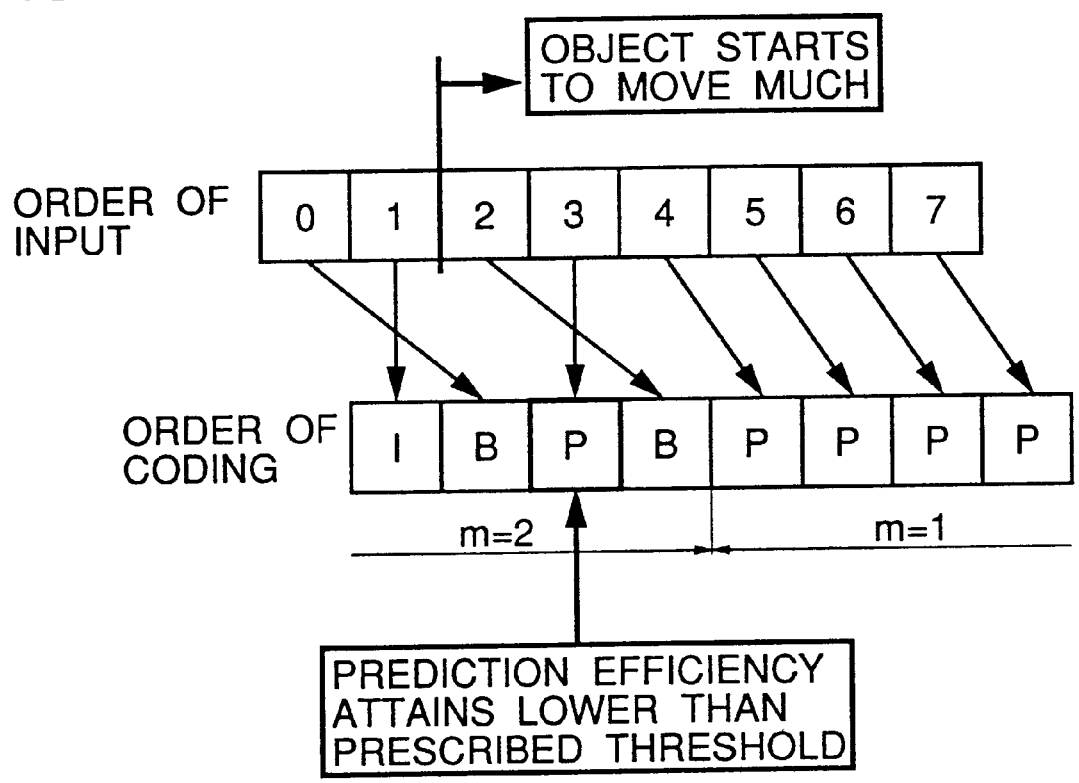
FIG. 14 shows a change in reference frame interval when prediction efficiency is below a prescribed threshold value in coding the P picture.

Referring to FIG. 14, for example, when an image is being coded with the reference frame interval m set to m=2, assume that the object starts to move much after the second frame. In other words, it becomes necessary to reduce the reference frame interval from the second frame.

At this time, by rearrangement of the image sequence, the third frame is coded before the second frame (S2 of FIG. 13). Accordingly, in coding the third frame, the prediction efficiency attains lower than the prescribed threshold value (NO in S4 of FIG. 13), and it is recognized that the object starts to move much. Since the second frame should be coded following the third frame in accordance with the common procedure, a process for reducing the reference frame interval m becomes possible in coding the fourth and the following frames. Therefore, the reference frame interval m is set to m=2 until the third frame, and from the fourth frame, the reference frame interval m is reduced to m=1.

As described above, different from GOP by GOP control in accordance with the prior art (Japanese Patent Laying-Open No. 8-65678), in the present invention, prediction structure is controlled based on the reference frame interval. Therefore, even when the object or camera moves abruptly, the control can follow quickly, ensuring enhanced image quality.

Figure 1:
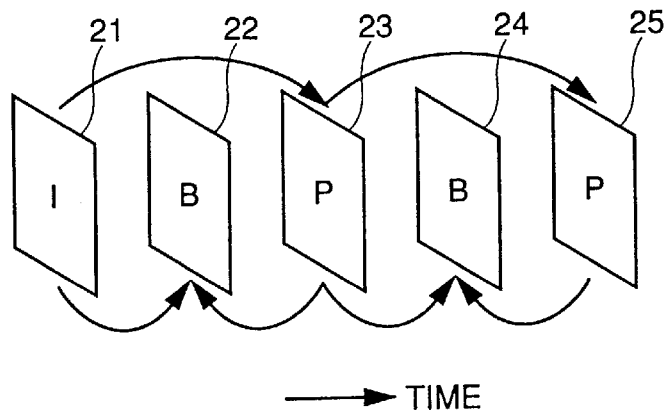
FIG. 1 is an illustration showing prediction structure in MPEG.
Figure 2A:
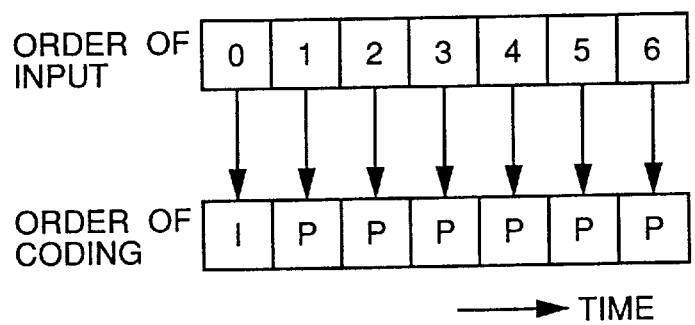
FIGS. 2A to 2C are illustrations showing rearrangement of image sequence in MPEG.
Figure 2B:
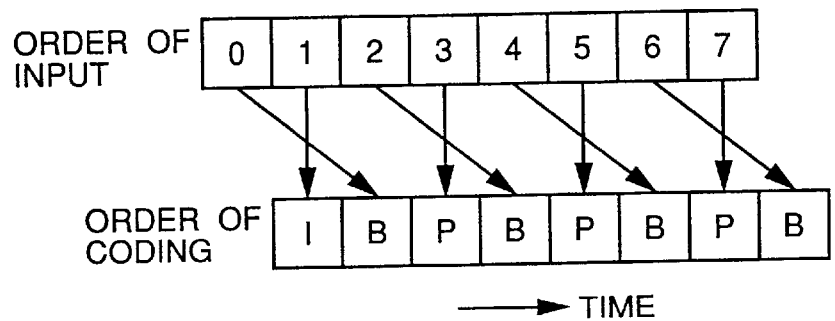
Figure 2C:
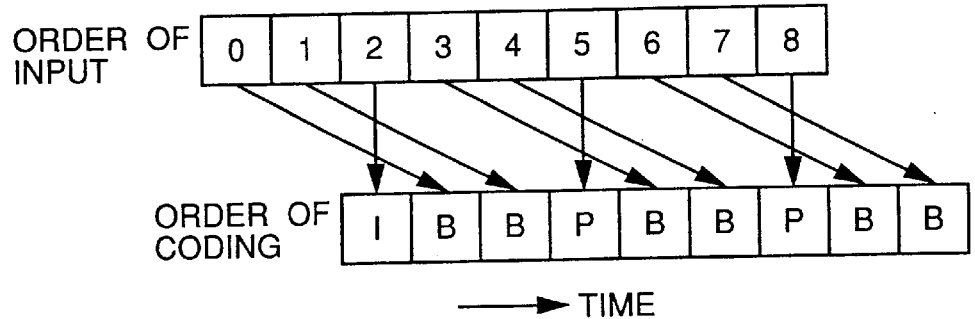
Figure 3:
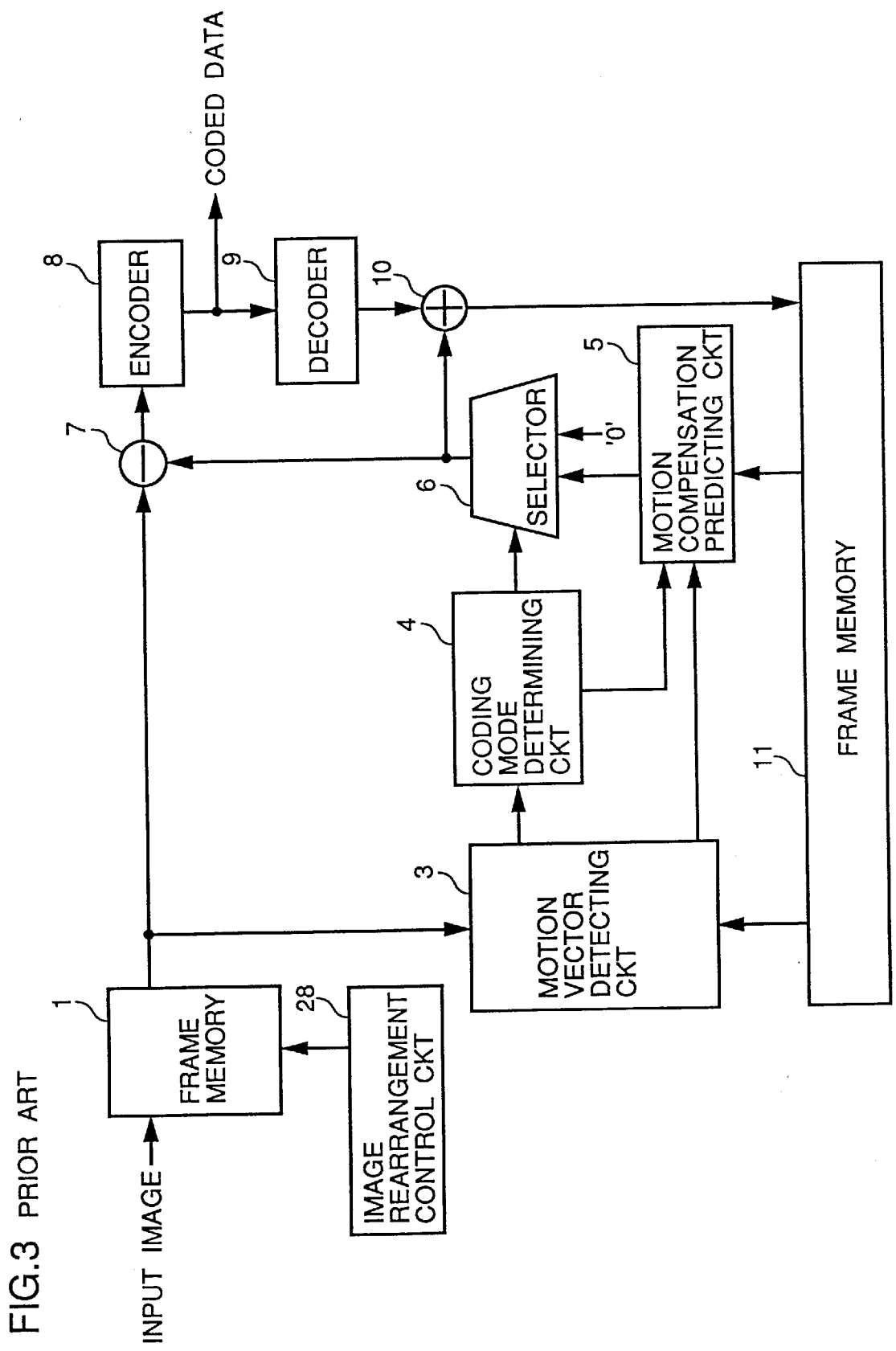
FIG. 3 is a block diagram showing a structure of a conventional motion image coding apparatus.
Figure 4:
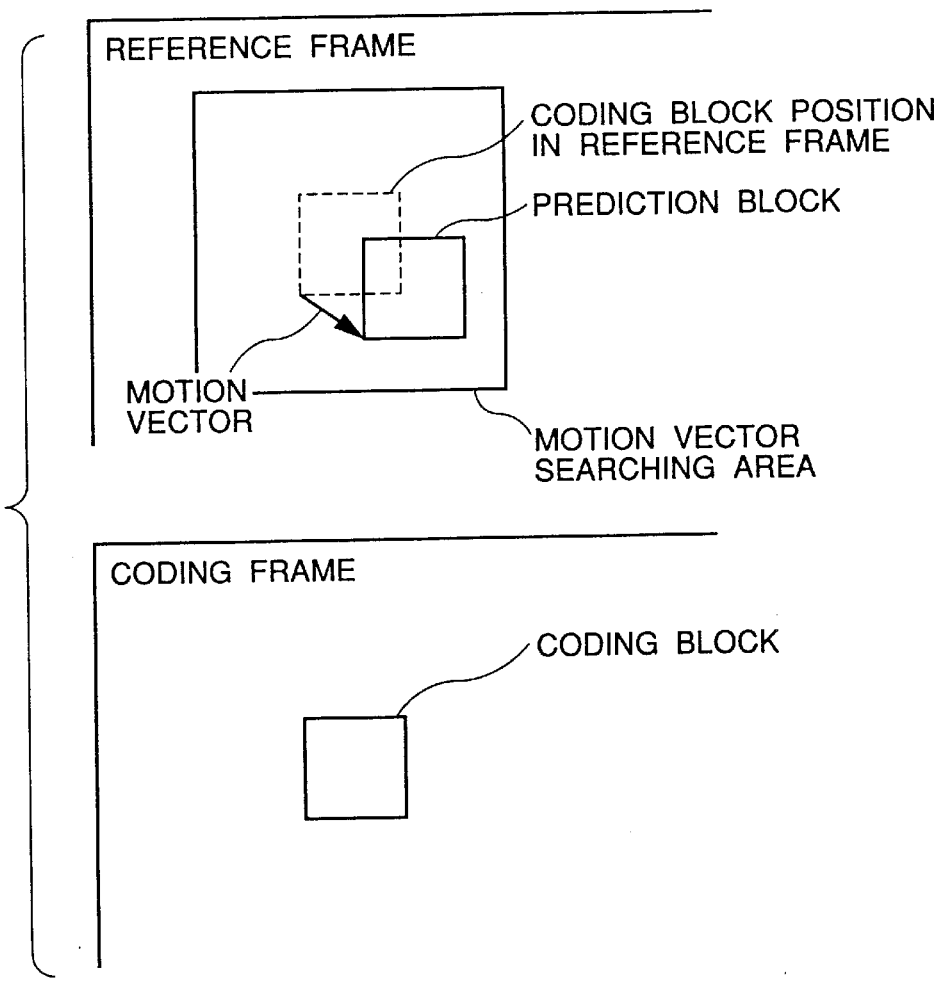
FIG. 4 is an illustration related to motion vector detection.
Figure 5:
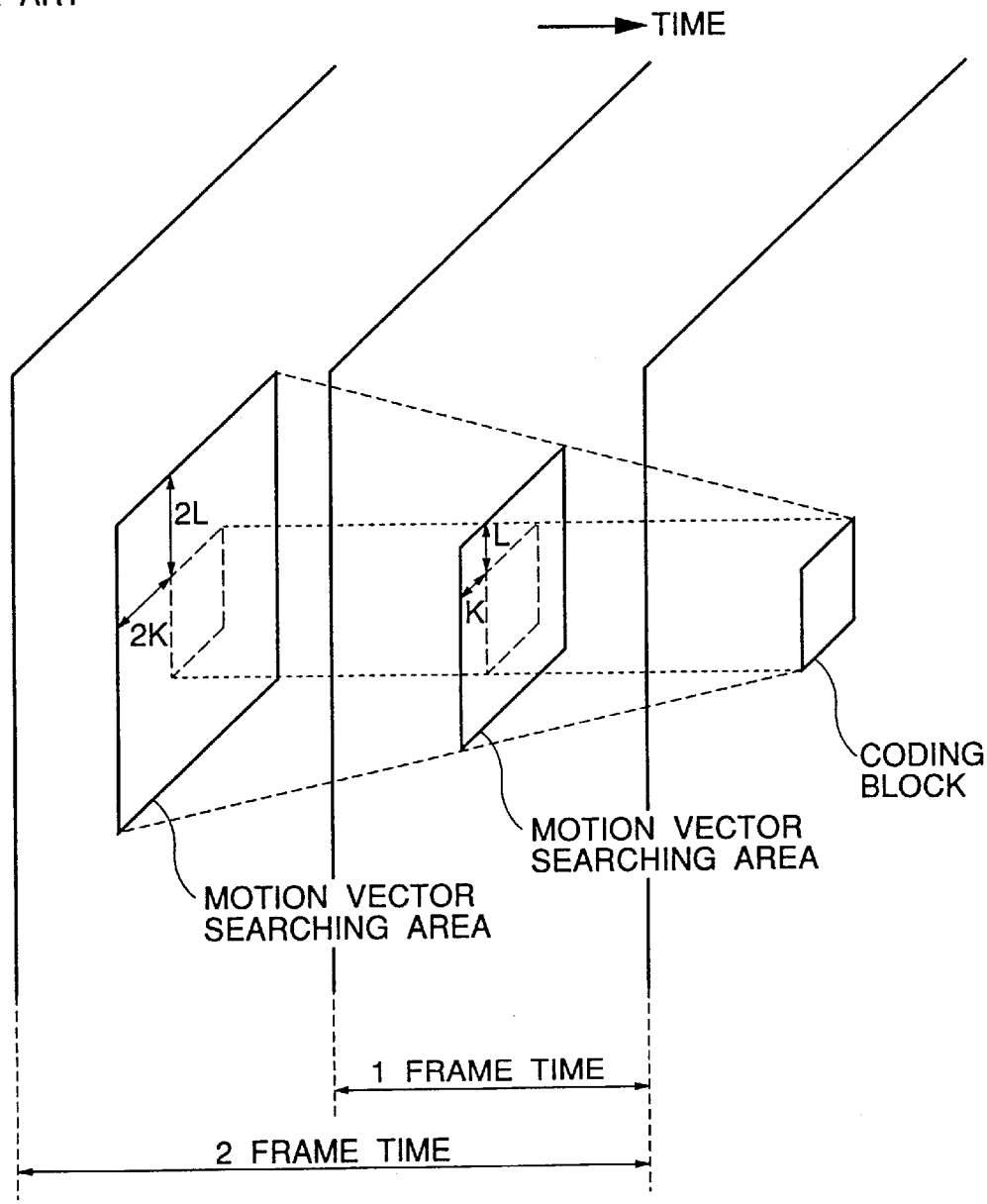
FIG. 5 represents relation between distance in time between a coding frame and a reference frame and area of searching of the motion vector.
Figure 6:
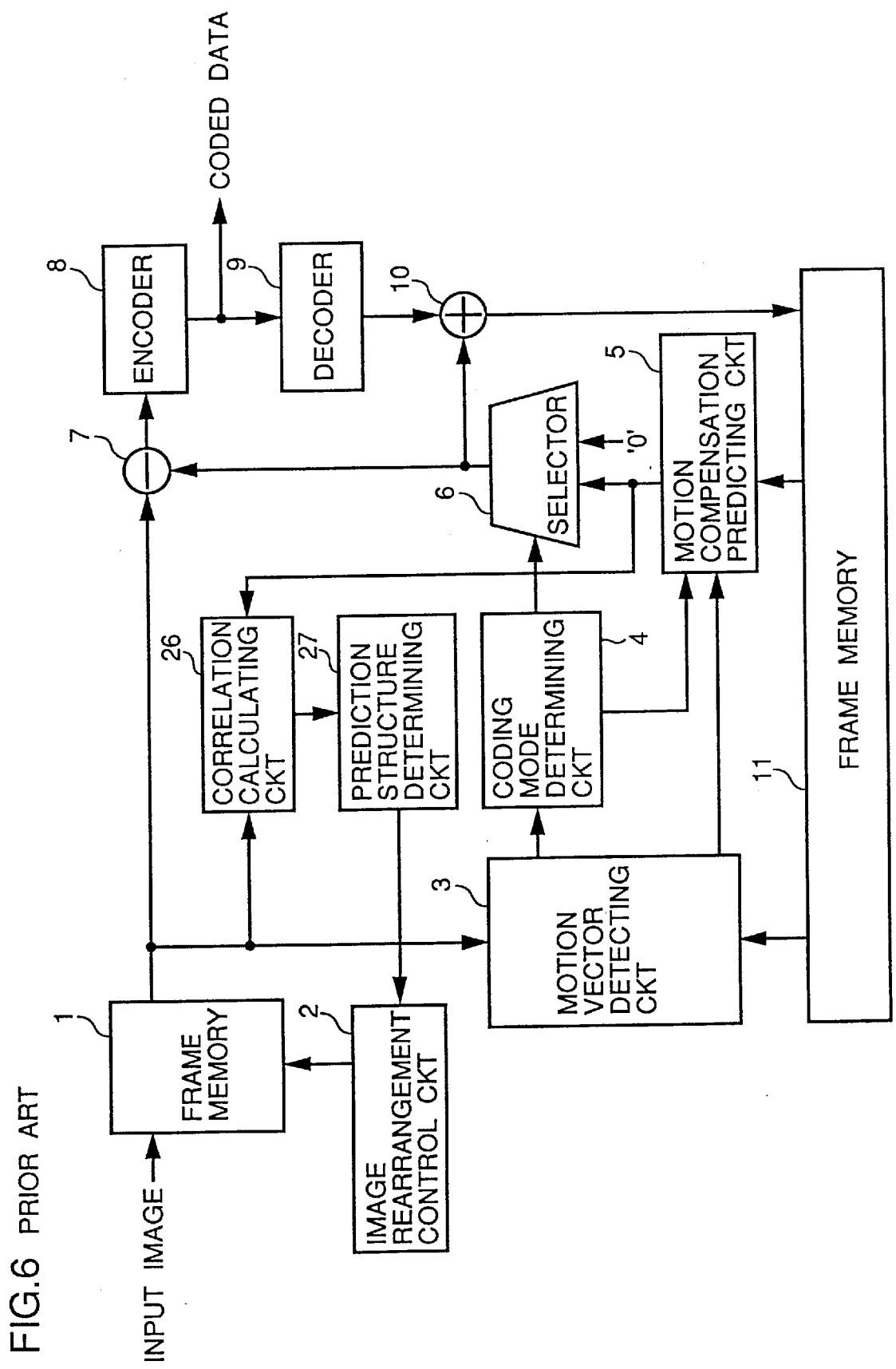
FIG. 6 is a block diagram showing a structure of a conventional motion image coding apparatus performing the process disclosed in Japanese Patent Laying-Open No. 8-65678.

Further, as shown in FIG. 5, by making shorter the time distance between the reference frame and the coding frame, it becomes necessary to widen substantial area of searching the motion vector. In other words, even if the area of search of the motion vector is small, the time distance between the reference frame and the coding frame is set shorter in accordance with the area of search of the motion vector, whereby prediction efficiency is improved. Accordingly, optimal prediction structure in accordance with the circuit scale of the motion vector detecting circuit can be set.

Figure 15:
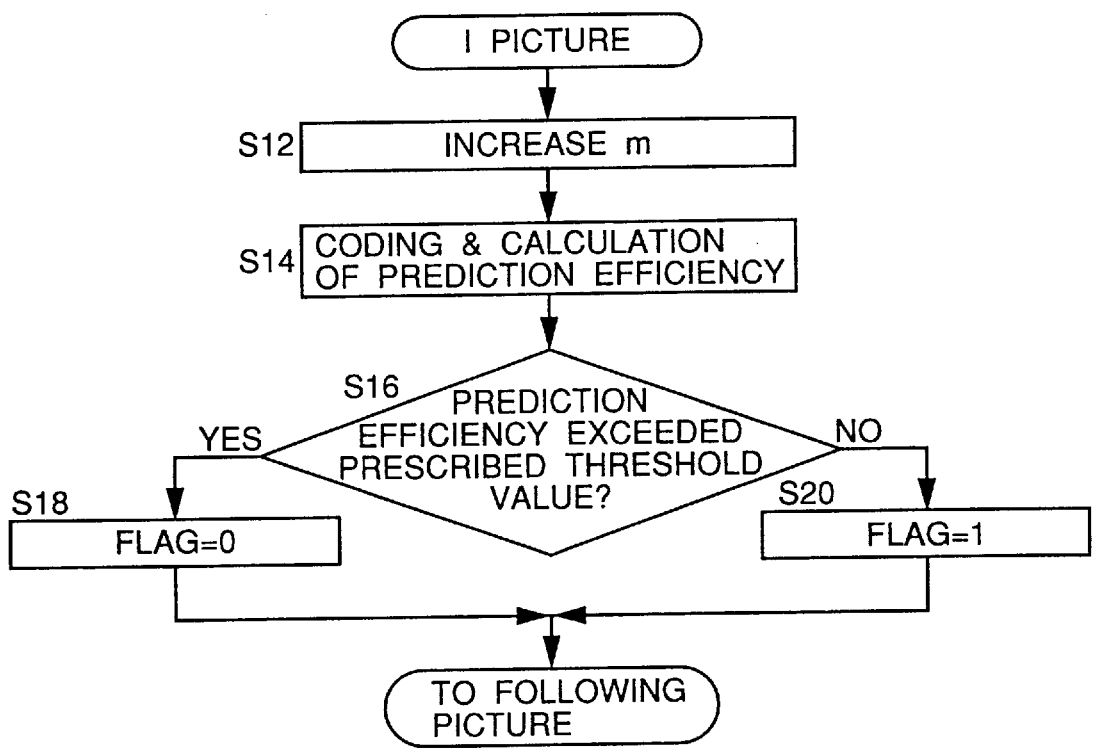
FIG. 15 is a flow chart showing an operation of the motion image coding apparatus when an I picture is coded.

Referring to FIG. 15, prediction efficiency calculating circuit 12 and reference frame interval determining circuit 13 operate in the following manner when the I picture is coded. Reference frame interval determining circuit 13 increases the reference frame interval m (S12). I picture is coded, and prediction efficiency calculating circuit 12 tentatively calculates the prediction efficiency (S14). Reference frame interval determining circuit 13 determines whether the prediction efficiency exceeds a prescribed threshold value or not (S16). When the prediction efficiency exceeds the prescribed threshold value (YES in S16), reference frame interval determining circuit 13 sets the flag to zero (S18). In other words, the value of the reference frame interval m which has been increased in S12 is used in the subsequent coding. When the prediction efficiency is lower than the prescribed threshold value (NO in S16), reference frame interval determining circuit 13 sets the flag to 1 (S20).

Figure 16:
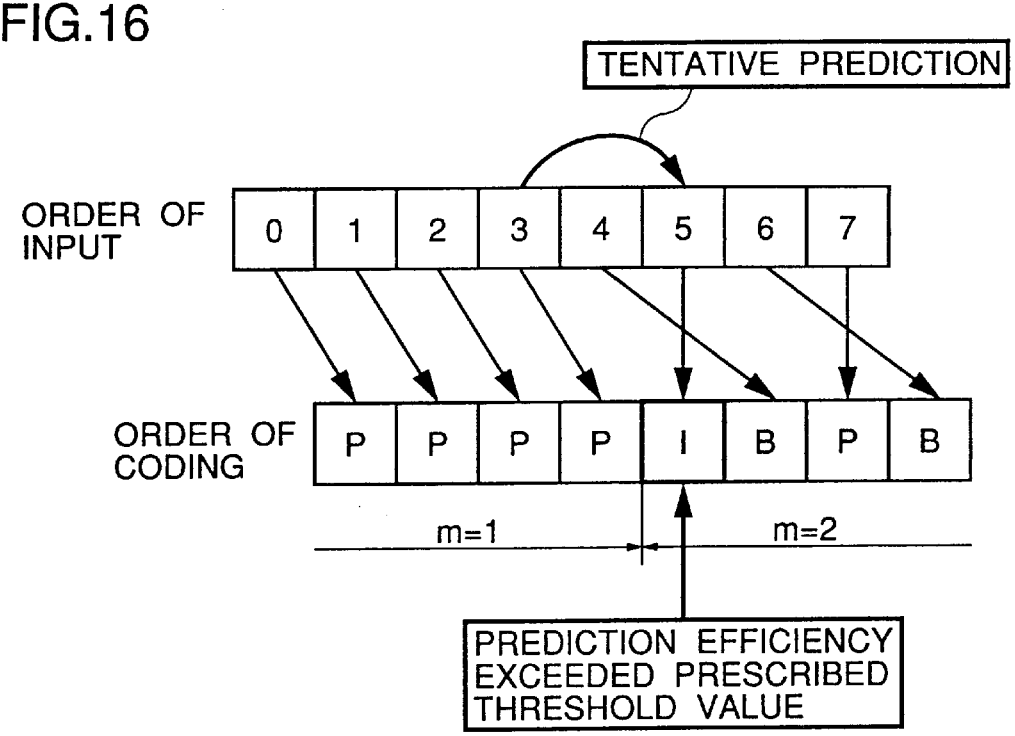
FIG. 16 shows a change in reference frame interval when prediction efficiency exceeds a prescribed threshold value in coding the I picture.
Figure 17:
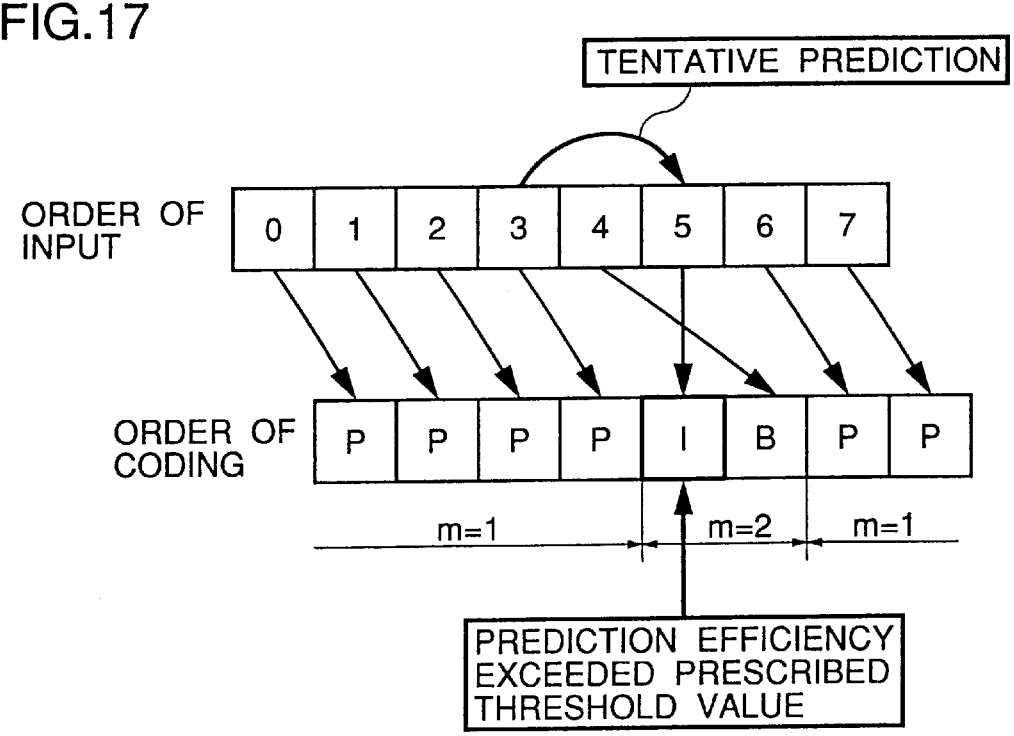
FIG. 17 shows a change in reference frame interval when prediction efficiency is below a prescribed threshold value in coding the I picture.

Referring to FIGS. 16 and 17, assume that the motion image coding apparatus is processing with the reference frame interval m being m=1. After coding the third frame, prediction efficiency with the interval m being m=2 is studied. Therefore, the fourth frame is taken as the B picture, m is set to m=2 (S12 of FIG. 15), and the fifth frame is taken as the I picture. Therefore, by rearrangement of image sequence, the fifth frame is coded before the fourth frame. Here, it is assumed that the fifth frame is predetermined to be I picture.

Fifth frame is coded as the I picture, and therefore essentially, inter-frame prediction does not take place. However, prediction is performed tentatively in the similar manner as for the P picture, and prediction efficiency from immediately preceding third frame, which is the P picture, is calculated (S14 of FIG. 15).

In FIG. 16, it is determined that the prediction efficiency in coding the fifth frame exceeds the prescribed threshold value, that is, it is determined that the prediction efficiency is high (YES in S16 of FIG. 15), and therefore coding continues for the sixth and the following frames with the interval kept at m=2. Meanwhile, in the example of FIG. 17, it is determined that the prediction efficiency in coding the fifth frame is lower than the prescribed threshold value, that is, it is determined that the prediction efficiency is low (NO in S16 of FIG. 15), and therefore coding is performed on the sixth and the following frames with the interval returned to m=1.

The coding efficiency of I picture itself is not dependent on the prediction efficiency. Therefore, by increasing the interval m for the I picture to tentatively calculate the prediction efficiency, the prediction efficiency when the interval m is increased can be studied without lowering the coding efficiency. Therefore, whether prediction efficiency is satisfactory or not with the interval m increased can effectively be determined.

Figure 18:
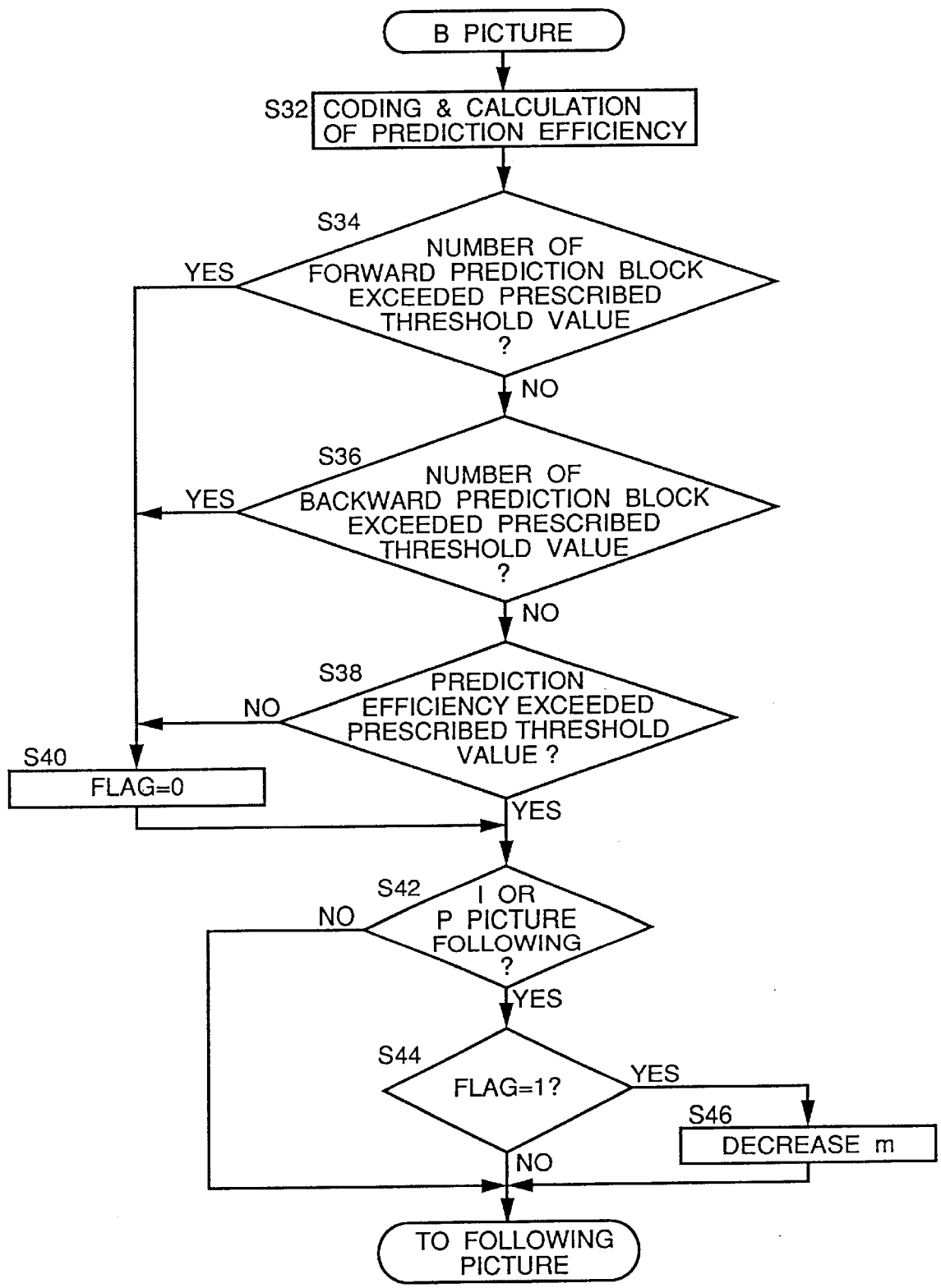
FIG. 18 is a flow chart showing an operation of the motion image coding apparatus when a B picture is coded.

Referring to FIG. 18, when the B picture is coded, prediction efficiency calculating circuit 12 and reference frame interval determining circuit 13 operate in the following manner. B picture is coded, and prediction efficiency calculating circuit 12 calculates the prediction efficiency (S32). Reference frame interval determining circuit 13 determines whether the number of coding blocks for which forward prediction mode is selected exceeds a prescribed threshold value or not (S34). When the number of coding blocks exceeds the prescribed threshold value (YES in S34), the reference frame interval determining circuit 13 sets the flag to zero (S40). When the number of coding blocks is lower than the prescribed threshold value (NO in S34), reference frame interval determining circuit 13 determines whether the number of coding blocks for which the backward prediction mode is selected exceeds a prescribed threshold value or not (S36).

When the number of coding blocks exceeds the prescribed threshold value (YES in S36), reference frame interval determining circuit 13 sets the flag to zero (S40). When the number of coding blocks is lower than the prescribed threshold value (NO in S36), reference frame interval determining circuit 13 determines whether prediction efficiency exceeds a prescribed threshold value or not (S38).

When the prediction efficiency is lower than the prescribed threshold value (NO in S38), reference frame interval determining circuit 13 sets the flag to zero (S40). When the prediction efficiency exceeds the prescribed threshold value (YES in S38), reference frame interval determining circuit 13 determines whether the following picture is an I picture or a P picture (S42).

When the following picture is an I picture or a P picture (YES in S42), then reference frame interval determining circuit 13 determines whether the flag is set to 1 or not (S44). If the flag is set to 1 (YES in S44), reference frame interval determining circuit 13 decreases the reference frame interval m (S46). If the following picture is neither an I picture nor a P picture (NO in S42), or if the flag is not set to 1 (NO in S44), processing of the B picture is terminated.

Figure 19:
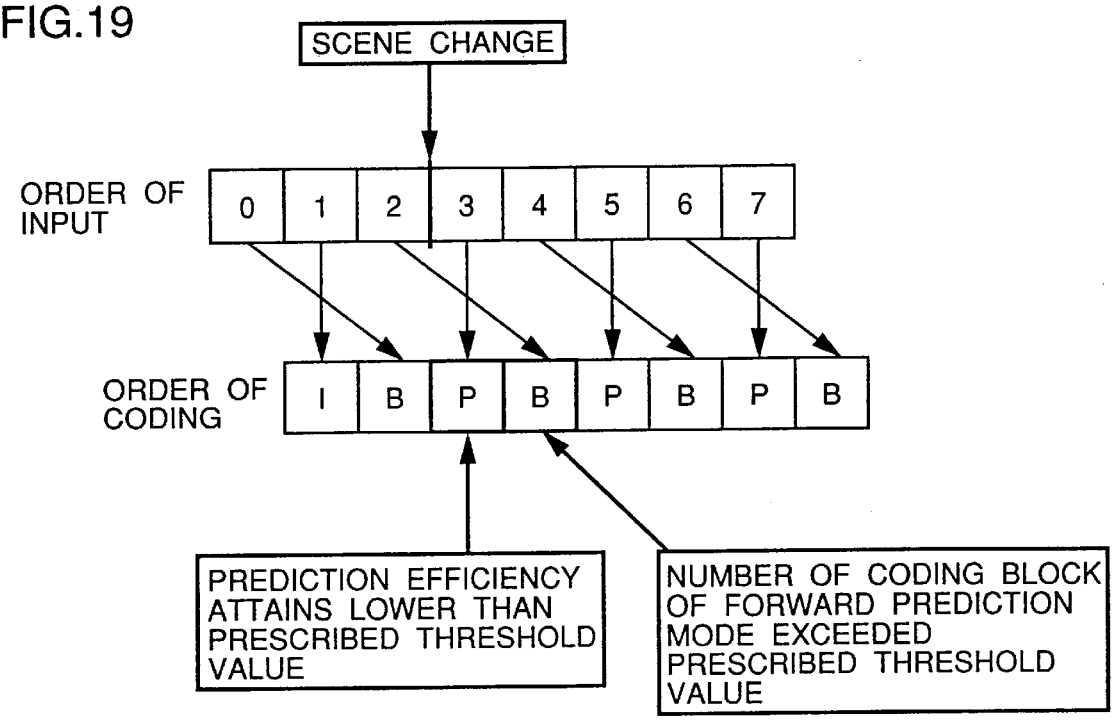
FIG. 19 is an illustration showing control of the reference frame interval when there is a scene change between the second and third frames.
Figure 20:
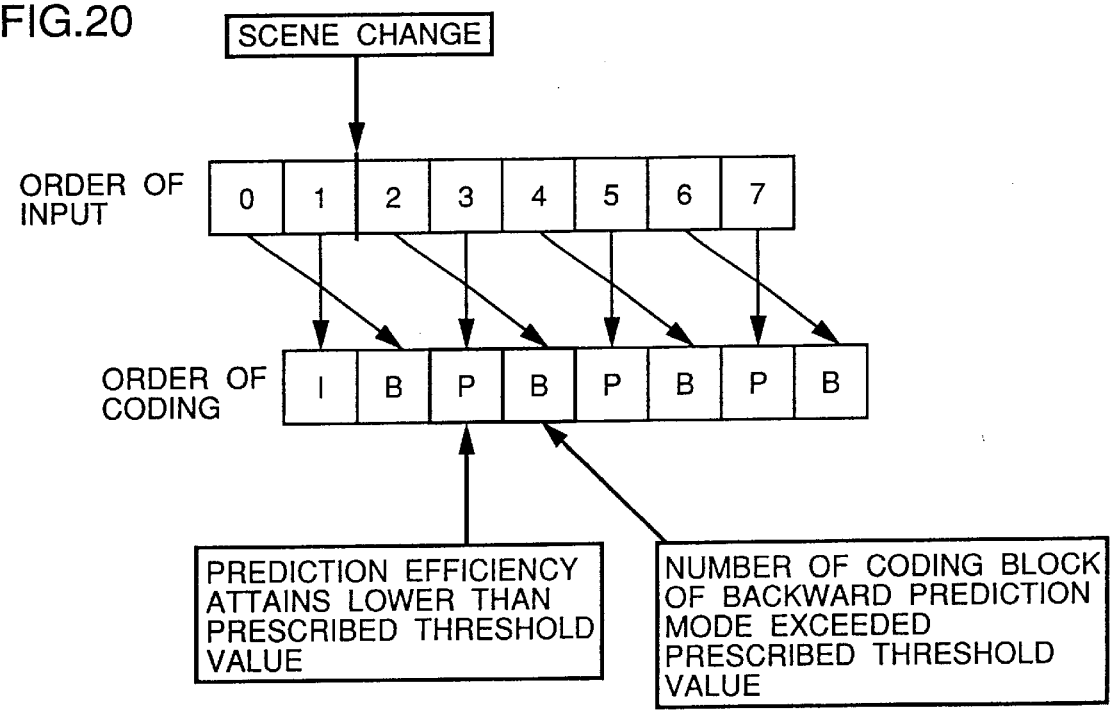
FIG. 20 is an illustration showing control of the reference frame interval when there is a scene change between the first and second frames.

Referring to FIG. 19, processing by prediction efficiency calculating circuit 12 and reference frame interval determining circuit 13 will be described assuming that a scene change occurs between the second and third frames while coding is being performed with the interval set to m=2. Referring to FIG. 20, processing by prediction efficiency calculating circuit 12 and reference frame interval determining circuit 13 will be described assuming that a scene change occurs between the first and second frames while coding is performed with the interval set to m=2.

When there is a scene change, selection ratio of bidirectional prediction decreases in the B picture which is at the point of scene change, and the ratio of selection of the forward prediction or backward prediction increases. In FIG. 19, scene change occurs immediately after the second frame which is coded as the B picture, and the ratio of selection of the forward prediction (the ratio of YES in S34 of FIG. 18) increases in the B picture. By contrast, in FIG. 20, scene change occurs immediately before the second frame which is coded as the B picture, and the ratio of selection of backward prediction (ratio of YES in S36 of FIG. 18) increases in the B picture. In either case, prediction efficiency in the third frame, which is predicted over the scene change decreases.

In FIGS. 19 and 20, the interval m is reduced in accordance with the process described with reference to FIG. 13, in the third frame which is coded as the P picture. In the second frame coded following the third frame, the number of coding blocks for which the forward prediction is selected (hereinafter referred to as forward prediction block) or the number of coding blocks for which the backward prediction is selected (hereinafter referred to as the backward prediction block) exceeds the prescribed threshold value (YES in S34 or S36 of FIG. 18), and therefore the process for reducing the interval m is stopped (S40 of FIG. 18).

When there is a scene change, the prediction efficiency decreases regardless of the prediction efficiency of the motion image sequence itself. However, decrease is temporary. Therefore, in such a case, coding efficiency of the sequence as a whole can be kept high when m is not decreased.

Figure 21:
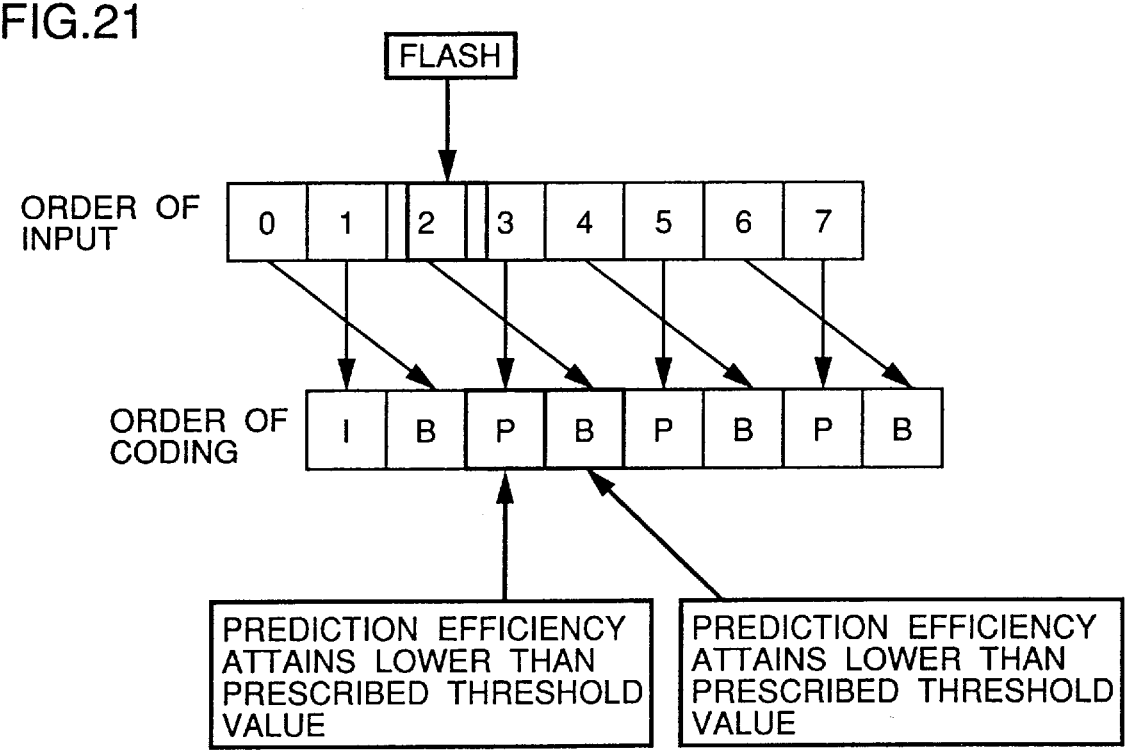
FIG. 21 is an illustration showing control of the reference frame interval when nature of images change as a flash light is used over the second and third frames.

Referring to FIG. 21, processing of prediction efficiency calculating circuit 12 and reference frame interval determining circuit 13 will be described assuming that illuminance value changes abruptly as flashlight is used over the second to third frame, while coding is performed with the interval set to m=2.

When a flashlight is used, nature of the image changes abruptly in a short period, and prediction efficiency decreases temporarily.

In FIG. 21, in the third frame which is coded as the P picture, the interval m is reduced in accordance with the process described with reference to FIG. 13. However, as the prediction efficiency is below the prescribed threshold value even in the second frame (NO in S38 of FIG. 18), which is the start point of flashlight, the process of reducing the interval m is stopped (S40 of FIG. 18).

When the prediction efficiency decreases because of a temporary change of the nature of image caused by a flashlight, for example, the coding efficiency of the sequence as a whole can be kept high by not decreasing the interval m, from the similar reason as described with respect to the scene change.

Figure 22:
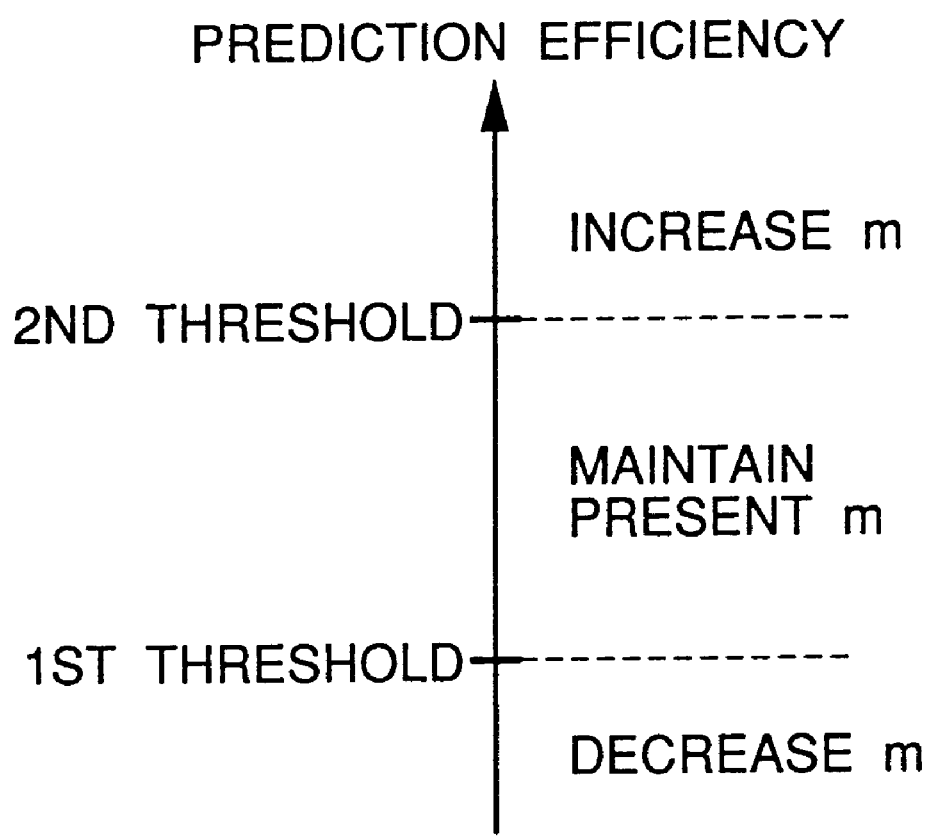
FIG. 22 is an illustration showing control of the reference frame interval in coding the I picture or the P picture.

Referring to FIG. 22, the prediction efficiency calculating circuit 12 and reference frame interval determining circuit 13 may perform the following operation when the I picture or the P picture is coded. Prediction efficiency calculating circuit 12 calculates the prediction efficiency. Reference frame interval determining circuit 13 compares the prediction efficiency with a first threshold value. When the prediction efficiency is below the first threshold value, the reference frame interval m in the subsequent coding is reduced. Reference frame interval determining circuit 13 compares the prediction efficiency and a second threshold value. When the prediction efficiency exceeds the second threshold value, reference frame interval m is increased in the subsequent coding. Here, it is assumed that the second threshold value is higher than the first threshold value.

Figure 23:
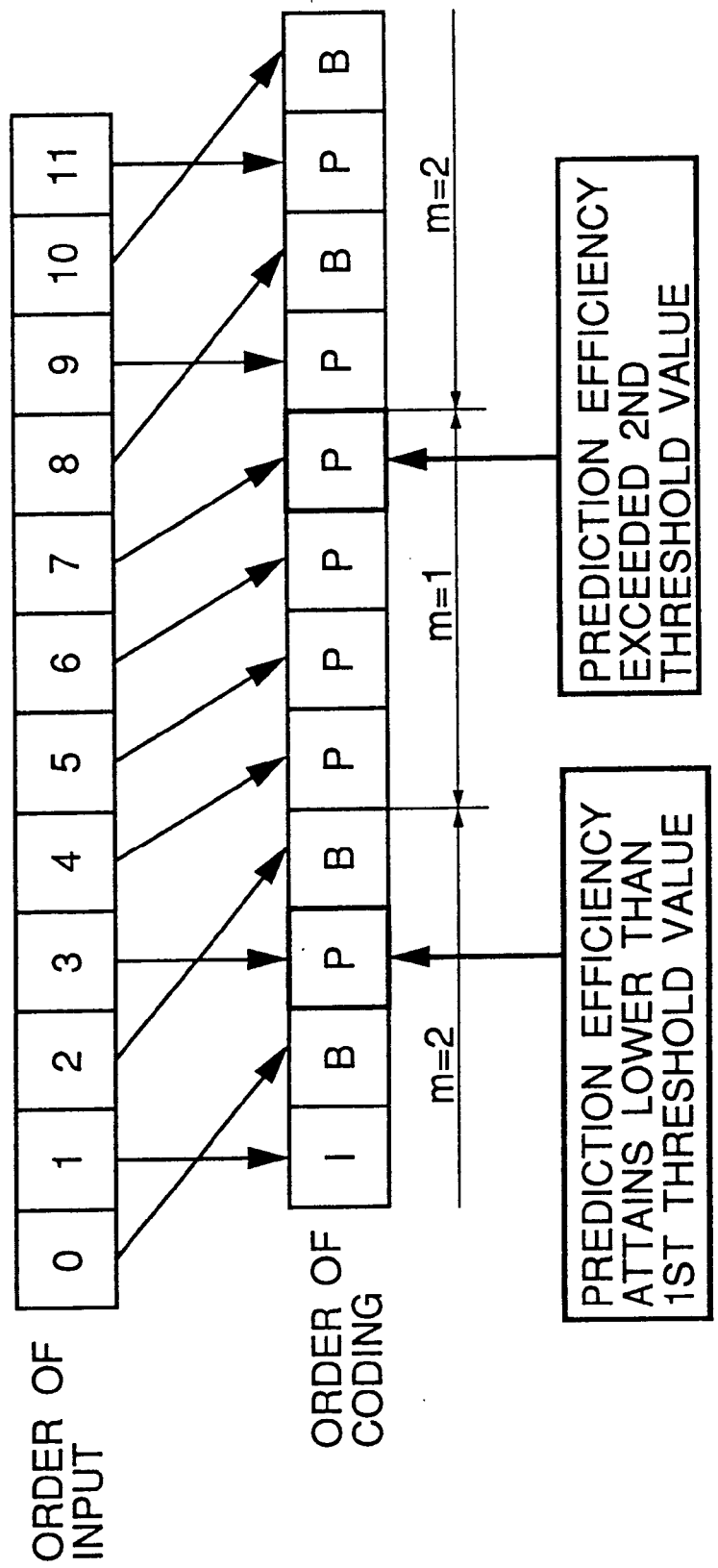
FIG. 23 is an illustration showing change in the reference frame interval when the prediction efficiency is below a first threshold value or exceeds a second threshold value in coding the I picture or the P picture.

In FIG. 23, prediction efficiency in coding the third frame is below the first threshold value. Therefore, reference frame interval m is reduced from m=2 to m=1 in coding the fourth and the following frames. Prediction efficiency in coding the seventh frame exceeds the second threshold value. Therefore, reference frame interval m is increased from m=1 to m=2 in coding the eighth and the following frames.

Since the interval m can be increased/decreased at the positions of I and P pictures, control of interval m in smaller unit is possible as compared with increase of m only in the coding of I picture.

Though the interval m is controlled to be 2 or 1, the interval may be controlled in the similar manner when the value is other than these.

Figure 24:
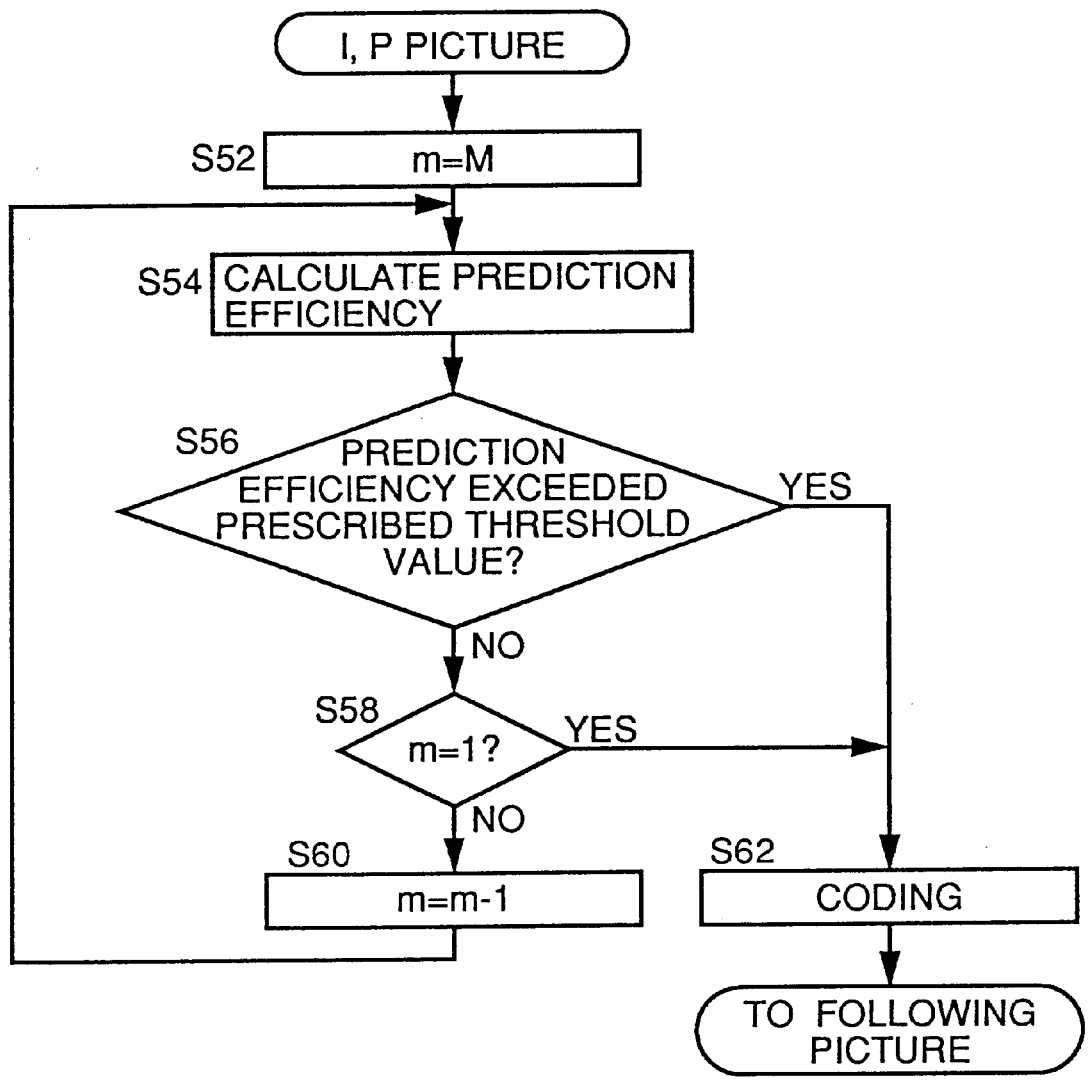
FIG. 24 is a flow chart showing an operation of the motion image coding apparatus in coding the I picture or P picture.

Referring to FIG. 24, prediction efficiency calculating circuit 12 and reference frame interval determining circuit 13 may perform the following operation in coding the I picture or the P picture. Reference frame interval determining circuit 13 sets the reference frame interval m to the maximum reference frame interval M (S52). Prediction efficiency calculating circuit 12 calculates the prediction efficiency with the reference frame interval of m (S54). Reference frame interval determining circuit 13 determines whether the prediction efficiency calculated in step S54 exceeds a prescribed threshold value or not (S56).

When reference frame interval determining circuit 13 determines that the prediction efficiency exceeds the prescribed threshold value (YES in S56), coding is performed with the reference frame interval m at that time (S62), and the process proceeds to the following picture. When the prediction efficiency is determined to be lower than the prescribed threshold value (NO in S56), then whether or not the reference frame interval m attains 1 or not is determined (S58).

When it is determined by the reference frame interval determining circuit 13 that the reference frame interval m does not reach 1 (NO in S58), then reference frame interval m is decremented by 1 (S60), and processes following the step S54 are repeated. When it is determined by reference frame interval determining circuit 13 that the reference frame interval m is 1 (YES in S58), the reference frame interval m cannot further be reduced. Accordingly, reference frame interval m is set to 1, coding is performed (S62) and the process proceeds to the following picture.

Figure 25A:
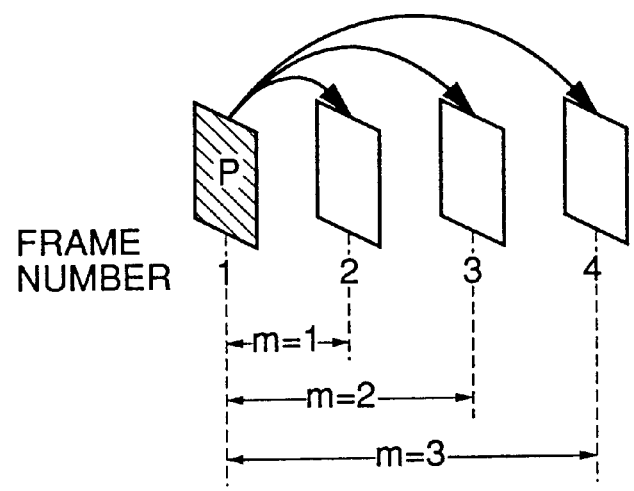
FIG. 25A represents relation between a coding frame and a reference frame.

FIG. 25A represents relation between a coding frame and a reference frame when M=3. Here, the first frame is a coded P picture, which is used as a reference frame for inter-frame prediction of the P picture to be coded next.

Figure 25B:
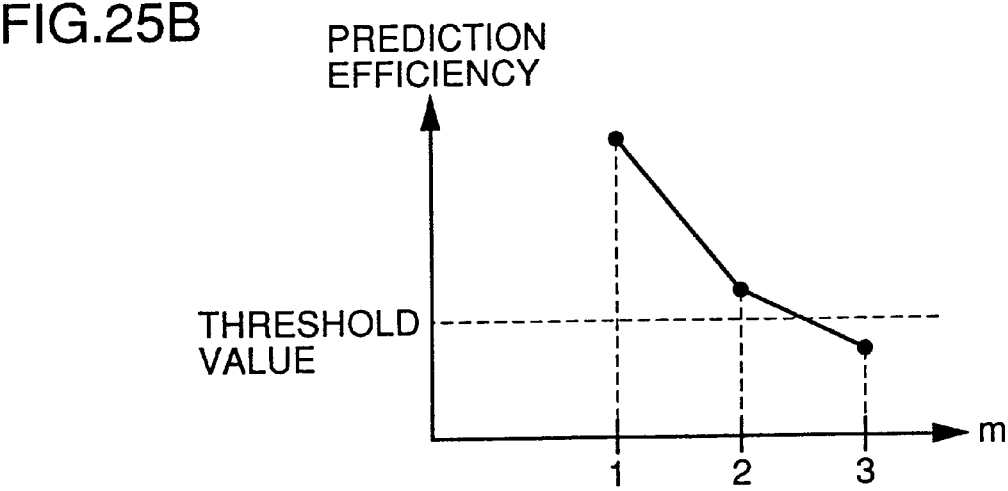
FIG. 25B represents relation between the reference frame interval and the prediction efficiency.

First, prediction efficiency is estimated (S54 of FIG. 24) assuming that the fourth frame (m=3), the third frame (m=2) and the second frame (m=1) are P pictures, respectively. Relation between the interval m and the prediction efficiency is as shown in FIG. 25B. Generally, the shorter the distance between the reference frame and the coding frame, the higher the prediction efficiency. In FIG. 25B, the maximum value of m where the prescribed efficiency exceeds the prescribed threshold value is m=2.

Figure 25C:
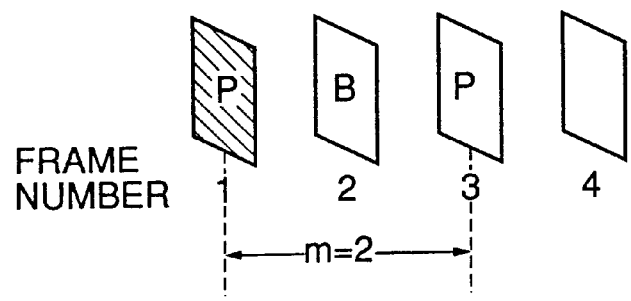
FIG. 25C represents relation between the reference frame interval and types of frames.

Therefore, the interval of m=2 is selected as shown in FIG. 25C (S56 of FIG. 24), and the third frame is coded as a P picture (S62 of FIG. 24). Therefore, the second frame is coded as a B picture, following the third frame.

Before coding of I and P pictures, prediction efficiencies for all selectable reference frame intervals are estimated, and based on the estimation, the reference frame interval to be used is determined. Therefore, it is possible to select optimal reference frame interval for coding the I picture and P picture, respectively.

Though processing for frame image has been mainly described, similar process is applicable to field images, and similar effects can be obtained in field by field coding.

According to the present invention, the interval between reference frames is controlled in accordance with the prediction efficiency. Accordingly, when inter-frame prediction error is large in the case where the object or camera moves abruptly, for example, the time distance to the reference frame is made smaller, so that the prediction efficiency is improved and the image quality is enhanced. When prediction error is small, time distance to the reference frame is enlarged and the amount of information allocated to the reference frame is increased, so as to enhance image quality.

Further, even when the area of search for the motion vector is small, the prediction efficiency can be kept high by making smaller the reference frame interval. Therefore, optimal prediction structure can be set in accordance with the circuit scale of motion vector detecting circuit 3.

Prediction efficiency calculating circuit 12 described with reference to FIG. 8 is capable of calculating the prediction efficiency simply by comparator 15 and counter 16. Prediction efficiency calculating circuit 12 described with reference to FIG. 9 is capable of calculating the prediction efficiency simply by comparator 17, counter 16 and constant multiplier 14. Therefore, the circuit scale of prediction efficiency calculating circuit 12 can be made very small.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A motion image coding apparatus in which each of a plurality of frames constituting a motion image sequence is divided into a plurality of coding blocks, and each of said plurality of frames is coded in accordance with a coding mode, coding block by coding block, said coding mode including a forward prediction mode using prediction based on a past reference frame, a backward prediction mode using prediction based on a future reference frame, a bidirectional prediction mode using as prediction, a mean value of prediction based on the past reference frame and prediction based on the future reference frame, and an intra-frame coding mode not using inter-frame prediction, each said frame being classified as a first frame in which each of said plurality of coding blocks is coded in accordance with said intra-frame coding, a second frame in which each of said plurality of coding blocks is coded in accordance with said forward prediction mode or said intra-frame coding mode, or a third frame in which each of said plurality of coding blocks is coded in accordance with any of said forward prediction mode, said backward prediction mode, said bidirectional prediction mode and said intra-frame coding mode, said apparatus comprising:

coding means for coding said first, second and third frames;

prediction efficiency calculating means for calculating prediction efficiency of inter-frame prediction, in coding by said coding means using said first or second frame as a reference frame; and reference frame interval determining means for determining a reference frame interval which is a time interval between said first and second frames, a time interval between said second frames, and a time interval between said first frames, in accordance with an output from said prediction efficiency calculating means.

2. The motion image coding apparatus according to claim 1, wherein said prediction efficiency calculating means includes first means for calculating said prediction efficiency using prediction error in inter-frame prediction for each of said plurality of coding blocks.

3. The motion image coding apparatus according to claim 2, wherein said first means includes a comparator for comparing said prediction error with a prescribed threshold value, and a counter connected to an output of said comparator for counting said prediction error exceeding said prescribed threshold value for each said frame, and outputting result of counting as said prediction efficiency.

4. The motion image coding apparatus according to claim 2, wherein said first means includes means for calculating an accumulated value of said prediction error in a frame, and a divider for calculating a reciprocal of said accumulated value for calculating said prediction efficiency.

5. The motion image coding apparatus according to claim 2, wherein said prediction error is a sum of absolute value of a difference between each of said plurality of coding blocks and a prediction block corresponding to each of said plurality of coding blocks.

6. The motion image coding apparatus according to claim 2, wherein said prediction error is a square sum of a difference between each of said plurality of coding blocks and a prediction block corresponding to each of said plurality of coding blocks.

7. The motion image coding apparatus according to claim 1, wherein said prediction efficiency calculating means includes first means for calculating said prediction efficiency using prediction error in inter-frame prediction for each of said plurality of coding blocks and an activity for each of said plurality of coding blocks.

8. The motion image coding apparatus according to claim 7, wherein said first means includes a multiplier for multiplying said activity by a prescribed coefficient, a comparator receiving an output from said multiplier, said prediction error and a prescribed threshold value, for comparing said prediction error and the output of said multiplier, and for comparing said prediction error and said prescribed threshold value, and a counter connected to an output of said comparator for counting said prediction error smaller than the output of said multiplier and said prediction error smaller than said prescribed threshold value for each said frame, and outputting a result of counting as said prediction efficiency.

9. The motion image coding apparatus according to claim 7, wherein said first means includes a divider receiving said prediction error and said activity, for dividing said activity by said prediction error, and means for accumulating an output of said divider to calculate said prediction efficiency.

10. The motion image coding apparatus according to claim 7, wherein said prediction error is a sum of absolute value of difference between each of said plurality of coding blocks and a prediction block corresponding to each of said plurality of coding blocks.

11. The motion image coding apparatus according to claim 7, wherein said prediction error is a square sum of a difference between each of said plurality of coding blocks and a prediction block corresponding to each of said plurality of coding blocks.

12. The motion image coding apparatus according to claim 7, wherein said activity is a sum of absolute value of AC component in each of said plurality of coding blocks.

13. The motion image coding apparatus according to claim 7, wherein said activity is a square sum of AC component in each of said plurality of coding blocks.

14. The motion image coding apparatus according to claim 1, wherein said reference frame interval determining means includes means for reducing, when said prediction efficiency in coding said second frame is lower than a first threshold value, said reference frame interval after said second frame.

15. The motion image coding apparatus according to claim 14, wherein said reference frame interval determining means further includes means for controlling, only when there is said third frame in which number of coded blocks for which said forward prediction mode is selected is smaller than a second threshold value and number of coding blocks for which said backward prediction mode is selected is lower than a third threshold value, said reference frame interval after said third frame.

16. The motion image coding apparatus according to claim 14, wherein said reference frame interval determining means further includes means for controlling, only when there is said third frame in which said prediction efficiency exceeds a second threshold value, said reference frame interval after said third frame.

17. The motion image coding apparatus according to claim 14, wherein said reference frame interval determining means further includes means for controlling, only when there is said third frame in which the number of coding blocks for which said forward prediction mode is selected is lower than a second threshold value, the number of coding blocks for which said backward prediction mode is selected is lower than a third threshold value and said prediction efficiency exceeds a fourth threshold value, said reference frame interval after said third frame.

18. The motion image coding apparatus according to claim 1, wherein said reference frame interval determining means includes means for calculating, using said reference frame interval at present as a first reference frame interval, a second reference frame interval by adding a prescribed value to said first reference frame interval, and means for comparing said prediction efficiency for said first frame determined by said second reference frame interval with a first threshold value, for setting, when said prediction efficiency exceeds said first threshold value, said reference frame interval for coding said first and the following frames to be said second reference frame interval, and when said prediction efficiency is lower than said first threshold value, setting said reference frame interval in coding said first and the following frames to be said first reference frame interval;

said prediction efficiency calculating means includes means for calculating said prediction efficiency for said first frame determined by said second reference frame interval, in a similar manner as said second frame.

19. The motion image coding apparatus according to claim 18, wherein said reference frame interval determining means further includes means for controlling, only when there is said third frame in which number of coded blocks for which said forward prediction mode is selected is smaller than a second threshold value and number of coding blocks for which said backward prediction mode is selected is lower than a third threshold value, said reference frame interval after said third frame.

20. The motion image coding apparatus according to claim 18, wherein said reference frame interval determining means further includes means for controlling, only when there is said third frame in which said prediction efficiency exceeds a second threshold value, said reference frame interval after said third frame.

21. The motion image coding apparatus according to claim 18, wherein said reference frame interval determining means further includes means for controlling, only when there is said third frame in which the number of coding blocks for which said forward prediction mode is selected is lower than a second threshold value, the number of coding blocks for which said backward prediction mode is selected is lower than a third threshold value and said prediction efficiency exceeds a fourth threshold value, said reference frame interval after said third frame.

22. The motion image coding apparatus according to claim 1, wherein said reference frame interval determining means includes means for reducing, when said prediction efficiency in coding said first or second frame is lower than a first threshold value, said reference frame interval in coding said following frames, and means for increasing, when said prediction efficiency in coding said first or second frame exceeds a second threshold value, said reference frame interval in coding following frames.

23. The motion image coding apparatus according to claim 1, wherein said reference frame interval determining means includes means for determining said reference frame interval such that when a position of a coding frame of said first or second frame is determined, among candidate frames for said coding frame, one for which said prediction efficiency exceeds a prescribed threshold value and which is newest in time is used as said coding frame.

24. A motion image coding apparatus in which a plurality of field images constituting a motion image sequence is divided into a plurality of coding blocks, and each of said plurality of field images is coded in accordance with a coding mode coding block by coding block, said coding mode including a forward prediction mode using prediction based on a past reference field image, a backward prediction mode using prediction based on a future reference field image, a bidirectional prediction mode using as prediction a mean value of prediction based on the past reference field image and prediction based on the future reference field image, and an intra-field coding mode not using inter-field prediction, each of said field images being classified as a first field image in which each of said plurality of coding blocks is coded in accordance with said intra-field coding mode, a second field image in which each of said plurality of coding blocks is coded in accordance with said forward prediction mode or said intra-field coding mode, or a third field image in which each of said plurality of coding blocks is coded in accordance with any of said forward prediction mode, said backward prediction mode, said bidirectional prediction mode and said intra-field coding mode, said apparatus comprising:

coding means for coding said first, second and third field images;

prediction efficiency calculating means for calculating prediction efficiency in inter-field prediction, in coding by said coding means using said first or second field image as a reference field image; and reference field image interval determining means for determining a reference field image interval which is a time interval between said first and second field images, a time interval between said second field images and a time interval between said first field images, in accordance with an output from said prediction efficiency calculating means.

* * * * *